(12) United States Patent
Fischmann

(10) Patent No.: US 11,453,603 B2
(45) Date of Patent: Sep. 27, 2022

(54) LOW COST AND SANITARY EFFICIENT METHOD THAT CREATES TWO DIFFERENT TREATMENT ZONES IN LARGE WATER BODIES TO FACILITATE DIRECT CONTACT RECREATIONAL ACTIVITIES

(71) Applicant: CRYSTAL LAGOONS TECHNOLOGIES, INC., New Castle, DE (US)

(72) Inventor: Fernando Benjamin Fischmann, Nassau (BS)

(73) Assignee: CRYSTAL LAGOONS TECHNOLOGIES, INC., Coral Gables, FL (US)

( * ) Notice: Subject to any disclaimer, the term of this patent is extended or adjusted under 35 U.S.C. 154(b) by 181 days.

(21) Appl. No.: 16/456,762

(22) Filed: Jun. 28, 2019

(65) Prior Publication Data
US 2020/0407251 A1   Dec. 31, 2020

(51) Int. Cl.
*C02F 1/52*  (2006.01)
*C02F 1/00*  (2006.01)
*C02F 1/50*  (2006.01)

(52) U.S. Cl.
CPC ............ *C02F 1/5236* (2013.01); *C02F 1/004* (2013.01); *C02F 1/50* (2013.01); *C02F 2001/007* (2013.01)

(58) Field of Classification Search
CPC .......... C02F 1/5236; C02F 1/004; C02F 1/50; C02F 1/52; C02F 1/00; C02F 1/76;
(Continued)

(56) References Cited

U.S. PATENT DOCUMENTS

| 2,071,520 A | 2/1937 | Harrison |
| 2,141,811 A | 12/1938 | Everson |

(Continued)

FOREIGN PATENT DOCUMENTS

| CN | 1256250 A | 6/2000 |
| CN | 102092824 A | 6/2011 |

(Continued)

OTHER PUBLICATIONS

International Search Report and Written Opinion for Application No. PCT/US2020/034909 dated Oct. 16, 2020.
(Continued)

*Primary Examiner* — Akash K Varma
(74) *Attorney, Agent, or Firm* — Merchant & Gould P.C.

(57) ABSTRACT

A treatment for a large body of water to make the water suitable for recreational purposes is disclosed. A sedimentation zone and a dissipation zone are designated in the water body. A disinfection method based on a CT index and a flocculant composition are utilized in the sedimentation zone to aid in the settling of different microorganisms and/or contaminants. Also, the water in the sedimentation zone is minimally disturbed to facilitate the sedimentation process. A permanent chlorine residual is maintained in the dissipation zone by adding an efficient amount of a chlorine disinfectant such that at least a 0.5 mg/L free chlorine level is maintained in the water volume. Water is injected into the dissipation zone by means of one or more inlet nozzles. Along with natural currents produced by winds and water temperature differences, a water dissipation pattern from within the dissipation zone into the sedimentation zone is generated.

35 Claims, 8 Drawing Sheets

(58) Field of Classification Search
CPC .... C02F 1/5245; C02F 1/56; C02F 2001/007; C02F 2103/00; C02F 2103/42; C02F 2303/04
USPC ........................................................ 210/764
See application file for complete search history.

(56) References Cited

U.S. PATENT DOCUMENTS

| | | |
|---|---|---|
| 2,314,767 A | 3/1943 | Burrell |
| 2,646,889 A | 7/1953 | Dulak |
| 2,923,954 A | 2/1960 | Babcock |
| 3,132,773 A | 5/1964 | Hampton |
| 3,247,053 A | 4/1966 | Hodge |
| 3,266,631 A | 8/1966 | Snaper |
| 3,317,925 A | 5/1967 | Vance |
| 3,361,150 A | 1/1968 | Horner |
| 3,406,416 A | 10/1968 | Presby et al. |
| 3,412,862 A | 11/1968 | Chaplin |
| 3,419,916 A | 1/1969 | Schankler |
| 3,470,091 A | 9/1969 | Budd et al. |
| 3,540,274 A | 11/1970 | Shore |
| 3,641,594 A | 2/1972 | Hough |
| 3,660,957 A | 5/1972 | Schankler |
| 3,695,434 A | 10/1972 | Whitten, Jr. |
| 3,748,810 A | 7/1973 | Mattingly |
| 3,788,982 A | 1/1974 | Zsoldos et al. |
| 3,844,760 A | 10/1974 | Nelson |
| 3,887,666 A | 6/1975 | Heller et al. |
| 3,950,809 A | 4/1976 | Schatzmann |
| 4,060,575 A | 11/1977 | Uhlirsch et al. |
| 4,090,266 A | 5/1978 | Price |
| 4,100,641 A | 7/1978 | Pansini |
| 4,119,535 A | 10/1978 | White et al. |
| 4,129,904 A | 12/1978 | Pansini |
| 4,176,058 A | 11/1979 | Grobler |
| 4,254,525 A | 3/1981 | Combest |
| 4,254,818 A | 3/1981 | Melamed |
| 4,263,759 A | 4/1981 | Miller |
| 4,304,022 A | 12/1981 | Sommer |
| 4,306,967 A | 12/1981 | Trautwein |
| 4,338,697 A | 7/1982 | Broadwater |
| 4,343,696 A | 8/1982 | Hung |
| 4,402,101 A | 9/1983 | Van Zyl |
| 4,464,215 A | 8/1984 | Cogliano |
| 4,519,914 A | 5/1985 | Etani |
| 4,581,075 A | 4/1986 | St. Martin |
| 4,640,784 A | 2/1987 | Cant |
| 4,652,378 A | 3/1987 | Marikovsky et al. |
| 4,692,956 A | 9/1987 | Kassis |
| 4,752,740 A | 6/1988 | Steininger |
| 4,767,511 A | 8/1988 | Aragon |
| 4,768,532 A | 9/1988 | Johnson |
| 4,776,053 A | 10/1988 | Kiraly |
| 4,835,810 A | 6/1989 | Hugo |
| 4,849,024 A | 7/1989 | Supra |
| 4,880,547 A | 11/1989 | Etani |
| 4,889,622 A | 12/1989 | Newcombe-Bond |
| 4,931,187 A | 6/1990 | Derham et al. |
| 4,948,296 A | 8/1990 | Salter |
| 4,952,398 A | 8/1990 | Tapin |
| 5,028,321 A | 7/1991 | Stone et al. |
| 5,039,427 A | 8/1991 | Conover |
| 5,106,229 A | 4/1992 | Blackwell |
| 5,107,872 A | 4/1992 | Meincke |
| 5,108,514 A | 4/1992 | Kisner |
| 5,143,623 A | 9/1992 | Kroll |
| 5,172,445 A | 12/1992 | Chandler |
| 5,245,723 A | 9/1993 | Sommer |
| 5,268,092 A | 12/1993 | Eden |
| 5,293,659 A | 3/1994 | Rief et al. |
| 5,337,434 A | 8/1994 | Erlich |
| 5,342,570 A | 8/1994 | Ledoux et al. |
| 5,346,566 A | 9/1994 | White |
| 5,398,361 A | 3/1995 | Cason |
| 5,422,014 A | 6/1995 | Allen et al. |
| 5,454,129 A | 10/1995 | Kell |
| 5,569,371 A | 10/1996 | Perling |
| 5,616,239 A | 4/1997 | Wendell et al. |
| 5,662,940 A | 9/1997 | Hight et al. |
| 5,782,480 A | 7/1998 | Phillips |
| 5,802,631 A | 9/1998 | Friedman |
| 5,842,243 A | 12/1998 | Horvath et al. |
| 5,985,156 A | 11/1999 | Henkin et al. |
| 6,017,400 A | 1/2000 | Clark et al. |
| 6,149,819 A | 11/2000 | Martin et al. |
| 6,228,272 B1 | 5/2001 | Gola |
| 6,231,268 B1 | 5/2001 | Hausenbauer |
| 6,280,639 B1 | 8/2001 | Ortiz |
| 6,284,144 B1 | 9/2001 | Itzhak |
| 6,303,038 B1 | 10/2001 | Sanders et al. |
| 6,317,901 B1 | 11/2001 | Corpuel |
| 6,409,926 B1 | 6/2002 | Martin |
| 6,419,840 B1 | 7/2002 | Meincke |
| 6,444,176 B1 | 9/2002 | Yoshinaga et al. |
| 6,539,573 B1 | 4/2003 | Caccavella |
| 6,896,799 B2 | 5/2005 | Ohanian |
| 7,189,314 B1 | 3/2007 | Pace et al. |
| 7,252,843 B2 | 8/2007 | Moore et al. |
| 7,820,055 B2 | 10/2010 | Fischmann Torres |
| 7,832,959 B1 | 11/2010 | Groen et al. |
| 7,862,712 B2 | 1/2011 | Tak |
| 8,062,514 B2 | 11/2011 | Fischmann Torres |
| 8,070,942 B2 | 12/2011 | Fischmann Torres |
| 8,153,010 B2 | 4/2012 | Duarte et al. |
| 8,388,837 B2 | 3/2013 | Tormaschy et al. |
| 8,454,838 B2 | 6/2013 | Fischmann T. |
| 8,465,651 B2 | 6/2013 | Fischmann T. |
| 8,518,269 B2 | 8/2013 | Fischmann T. |
| 8,524,088 B2 | 9/2013 | Arbogast et al. |
| 8,753,520 B1 | 6/2014 | Fischmann |
| 8,790,518 B2 | 7/2014 | Fischmann Torres |
| 9,708,822 B2 | 7/2017 | Fischmann Torres |
| 2002/0117430 A1 | 8/2002 | Navarro et al. |
| 2003/0046933 A1 | 3/2003 | Moss et al. |
| 2003/0091467 A1 | 5/2003 | Kmec et al. |
| 2003/0094421 A1 | 5/2003 | Gargas |
| 2003/0228195 A1 | 12/2003 | Mizutani |
| 2004/0025269 A1 | 2/2004 | Pichon |
| 2004/0129644 A1 | 7/2004 | Unhoch |
| 2004/0211450 A1 | 10/2004 | Stoltz |
| 2004/0217326 A1 | 11/2004 | Souter et al. |
| 2004/0226896 A1 | 11/2004 | Lovestead et al. |
| 2005/0009192 A1 | 1/2005 | Page |
| 2005/0145552 A1 | 7/2005 | Sheets |
| 2005/0194322 A1 | 9/2005 | Palmer |
| 2005/0207939 A1 | 9/2005 | Roussi et al. |
| 2006/0054568 A1 | 3/2006 | Jones et al. |
| 2006/0169322 A1 | 8/2006 | Torkelson |
| 2006/0174430 A1 | 8/2006 | Pareti |
| 2007/0059562 A1 | 3/2007 | Hattori et al. |
| 2007/0181498 A1 | 8/2007 | Kaas |
| 2007/0181510 A1 | 8/2007 | Harvey et al. |
| 2008/0116142 A1* | 5/2008 | Fischmann Torres .. E02B 1/003 210/712 |
| 2008/0295615 A1 | 12/2008 | Sihalla |
| 2009/0050572 A1 | 2/2009 | Mcguire et al. |
| 2009/0087549 A1 | 4/2009 | Zhou et al. |
| 2010/0320147 A1 | 12/2010 | Mcguire et al. |
| 2011/0009019 A1 | 1/2011 | Neira et al. |
| 2011/0061194 A1 | 3/2011 | Fischmann Torres |
| 2011/0062067 A1 | 3/2011 | Fischmann Torres |
| 2011/0132815 A1 | 6/2011 | Angelilli et al. |
| 2011/0210076 A1* | 9/2011 | Fischmann Torres .... C02F 1/00 210/724 |
| 2012/0024769 A1 | 2/2012 | Martin et al. |
| 2012/0091069 A1 | 4/2012 | Fischmann T. |
| 2014/0166588 A1* | 6/2014 | Fischmann ............... C02F 1/76 210/742 |
| 2014/0332472 A1* | 11/2014 | Fishmann Torres .... C02F 1/766 210/721 |
| 2021/0163323 A1 | 6/2021 | Fischmann |

(56) References Cited

U.S. PATENT DOCUMENTS

FOREIGN PATENT DOCUMENTS

| | | |
|---|---|---|
| DE | 2 141 460 A1 | 2/1973 |
| DE | 38 44 374 A1 | 7/1990 |
| DE | 19515428 A1 | 11/1996 |
| DE | 297 16 994 U1 | 1/1998 |
| DE | 198 14 705 A1 | 10/1998 |
| DE | 198 60 568 B4 | 8/2005 |
| DE | 10 2010 019 510 A1 | 11/2011 |
| EP | 0 352 487 A1 | 1/1990 |
| EP | 0 468 876 B1 | 1/1992 |
| EP | 0 483 470 A1 | 5/1992 |
| EP | 1 420 130 A1 | 5/2004 |
| EP | 168 85 62 A2 | 8/2006 |
| ES | 200 14 29 A6 | 5/1998 |
| FR | 2 544 005 A1 | 10/1984 |
| FR | 2 668 527 A1 | 4/1992 |
| FR | 2 685 374 A1 | 6/1993 |
| FR | 2 740 493 A1 | 4/1997 |
| FR | 2 785 898 A1 | 5/2000 |
| GB | 1494005 | 12/1977 |
| GB | 2045606 A | 11/1980 |
| GB | 2 243 151 A | 10/1991 |
| JP | 59-012287 A | 1/1984 |
| JP | 59-222294 A | 12/1984 |
| JP | 4-115008 A | 4/1992 |
| JP | 5-220466 A | 8/1993 |
| JP | 05220466 A | 8/1993 |
| JP | 5-261395 A | 10/1993 |
| JP | 7-310311 A | 11/1995 |
| JP | 3026643 U | 7/1996 |
| JP | 10-169226 A | 6/1998 |
| JP | 2001-3586 A | 1/2001 |
| JP | 2001-9452 A | 1/2001 |
| JP | 2002-90339 A | 3/2002 |
| JP | 2002-282860 A | 10/2002 |
| JP | 2003-190989 A | 7/2003 |
| JP | 2003-200173 A | 7/2003 |
| JP | 2004-958 A | 1/2004 |
| JP | 2005-288392 A | 10/2005 |
| JP | 2006-68624 A | 3/2006 |
| JP | 2007-500073 A | 1/2007 |
| JP | 2011-5463 A | 1/2011 |
| KR | 20-0162956 | 9/1999 |
| TW | 432013 | 8/1987 |
| TW | 482186 | 12/1990 |
| UY | 30184 | 5/2007 |
| WO | WO 8101585 | 6/1981 |
| WO | WO 9848132 | 10/1998 |
| WO | WO 03/010388 | 2/2003 |
| WO | WO 2006/069418 | 7/2006 |
| WO | WO 2007/029277 | 3/2007 |
| WO | WO 2007/059562 | 5/2007 |
| WO | WO 2009/114206 | 9/2009 |
| WO | WO 2010/074770 | 7/2010 |

OTHER PUBLICATIONS

African Regional Intellectual Property Organization (ARIPO) report for corresponding application No. AP/P/2007/004242, 6 pages, dated Dec. 7, 2010.

Ambient Water Quality Criteria for Bacteria—1986, Jan. 1986, US EPA, EPA440/5-84-002, p. 16 (24 pages).
Chilean Examiner's report from Application No. 3900-08 dated Aug. 31, 2009, 7 pages.
Communication from EPO for corresponding application No. 09835402.0 dated Jan. 30, 2013, 5 pages.
Non-Final Office Action dated Jul. 19, 2011 from U.S. Appl. No. 13/076,151, 8 pages.
Final Office Action dated Nov. 28, 2011 from U.S. Appl. No. 13/076,151, 12 pages.
Non-Final Office Action dated Jun. 13, 2013 from U.S. Appl. No. 13/076,151, 14 pages.
Non-Final Office Action dated May 15, 2013 for U.S. Appl. No. 12/937,505, 14 pages.
Non-Final Office Action dated Jul. 31, 2013 for U.S. Appl. No. 13/886,615, 25 pages.
Non-Final Office Action dated Jul. 26, 2013 for U.S. Appl. No. 13/861,262, 24 pages.
Non-Final Office Action dated Sep. 6, 2013 for U.S. Appl. No. 13/948,619, 16 pages.
Non-Final Office Action dated Jul. 1, 2013 for U.S. Appl. No. 13/856,387, 14 pages.
Eurasian Office Action for corresponding application No. 201001477/31 and response to Office Action dated Apr. 2, 2013 with English Translation, 29 pages.
European Search Report from European Application No. 07 07 5995 dated Mar. 9, 2010, 15 pages.
International Search Report and Written Opinion for International Application No. PCT/US2011/051229 dated Feb. 8, 2012, 9 pages.
International Search Report and Written Opinion for International Application No. PCT/US2011/051236 dated Jan. 26, 2012, 9 pages.
International Search Report and Written Opinion for International Application No. PCT/US2011/051244 dated Jan. 25, 2012, 9 pages.
International Search Report and Written Opinion for PCT/EP2012/076170 dated Aug. 7, 2013, 12 pages.
International Search Report dated May 6, 2009, in co-pending related PCT Application No. PCT/US2009/036809, 3 pages.
Japanese Office Action for corresponding application No. 2007-299975 dated May 31, 2011—translation provided, 7 pages.
Norwegian Search Report from Norwegian Application No. 20075880 dated Feb. 4, 2010, 2 pages.
Pakistan Examination Report, 1 page, (originally cited in U.S. Appl. No. 13/955,699 dated Jan. 8, 2014).
Panama Search Report from Panama Application No. 88509-01 dated Oct. 7, 2010, 5 pages.
Peruvian Technical Report for corresponding application No. 000244-2007 dated Sep. 2, 2010—translation provided, 16 pages.
Response filed for EP 09835402.0 dated Aug. 14, 2013, 9 pages.
Response filed for EP 09835402.0 dated Jul. 23, 2013, 11 pages.
Second Singapore Office Action for corresponding application No. 200717963-3 dated Dec. 23, 2010, 7 pages.
Singapore Office Action for corresponding application No. 200717963-3 dated Dec. 23, 2010, 6 pages.
World Health Organization: Guidelines for safe recreational waters. vol. 2. Swimming pools and similar recreational water environments. Switzerland. Jun. 27, 2006 ISBN 92-4-154680-8 Chapter 4, 20 pages.
World Health Organization: Guidelines for safe recreational waters. vol. 2. Swimming pools and similar recreational water environments. Switzerland. Jun. 27, 2006 ISBN 92-4-154680-8 Chapter 5, 20 pages.

* cited by examiner (t = 0)

(t = 5)

(t = 10)

(t = 16)

(t = 20)

(t = 25)

(t = 60)

LOW COST AND SANITARY EFFICIENT METHOD THAT CREATES TWO DIFFERENT TREATMENT ZONES IN LARGE WATER BODIES TO FACILITATE DIRECT CONTACT RECREATIONAL ACTIVITIES

FIELD OF THE INVENTION

The present invention relates generally to treating a large body of water in order to make the water suitable for recreational purposes; more specifically for treating the water using a low cost sanitary system and method to minimize the risk of growth of microorganisms such as bacteria, protozoa, amoebas, microalgae and parasites, amongst others, thus solving the inefficiencies of current methods and systems in an innovative manner and at low costs. More specifically, the invention relates to a low cost and sanitary efficient system and method that creates two different treatment zones in large water bodies to facilitate direct contact recreational activities.

BACKGROUND OF THE INVENTION

Conventional swimming pool technology has been used and applied as the standard water treatment for small sized recreational water bodies for decades. However, such swimming pool technology has shown to be inefficient in the treatment and removal of several microorganisms from relatively small water bodies.

On the other hand, larger water bodies, like lakes used for swimming (hereafter referred to as "swimming lakes") with higher dilution capacities have also had problems and have been inefficient in the inactivation and removal of some microorganisms, regardless of whether the water body is periodically treated or is untreated. Furthermore, conventional swimming pool technology when applied to such large water bodies requires large capital costs, and requires large amounts of energy and chemicals to complete its operation and maintenance. These resulting costs make use of conventional technology of swimming pools very expensive when applied to large water bodies.

In general, recreational water bodies, such as swimming pools and larger water bodies like swimming lakes, are always prone to be contaminated by microorganisms such as bacteria, protozoa, amoebas, microalgae and parasites, amongst others, which can create risks for bathers that use such water bodies for swimming, bathing, and for other direct contact recreational uses.

A. Swimming Pools

For decades, swimming pool technology has been the most used water treatment technology for small water bodies used for recreational swimming purposes. Over this time, various health entities from around the world have adopted regulations concerning the water treatment in order to regulate minimum health standards for swimming pools.

Conventional swimming pool technology essentially requires a permanent disinfection of the complete water volume to maintain a high ORP (Oxidation Reduction Potential) or disinfectant concentration, such as free chlorine level on the water permanently. In addition, filtration of the complete water volume between one to six times per day (generally four times per day) is required to remove all suspended particles and contaminants from such water volume.

However, it is important to understand that, contrary to popular belief, conventional pool disinfection technology does not kill all germs or microorganisms instantly. Instead, there are chlorine resistant microorganisms that may survive in chlorinated pool water and trigger Recreational Water Illnesses (hereafter referred to as "RWIs"). Even though there are certain bacteria that are killed within seconds with normal swimming pool disinfection levels, there are many microorganisms that have high tolerance to chlorine or other disinfectants. These microorganisms can survive for many days after a contamination event has occurred in the pool, since swimming pool disinfection treatment is not designed to kill all such microorganisms. One microorganism that is highly resistant to conventional swimming pool disinfection technologies is, for example, *Cryptosporidium*. This is an important cause of RWIs, especially in treated water bodies such as swimming pools, as previously discussed. In fact, several studies show that free chlorine levels of about 1-3 ppm (such as the ones found in conventionally treated swimming pools), can take more than 10 days to inactivate 99.9% of *Cryptosporidium* oocysts, as such microorganism is highly resistant to conventional swimming pool disinfection methods. Therefore, many bathers may swim in a pool treated according to the pertinent regulations for swimming pool disinfection standards during that 10-day period and be exposed to infection by such microorganism.

Additionally, with respect to conventional pool filtration technology, generally sand filters are capable of filtering out particles in the size range of down to 20-25 microns and cartridge filters are typically capable of removing particles in the size range down to 5-10 microns. But, by way of example, *Cryptosporidium* oocysts are approximately 4-6 microns in size. This makes them very difficult to remove by conventional pool filtration with the commonly used filters being able to remove only about 25% of oocysts per passage through the filter.

Based on the foregoing, it will be appreciated that when there is a contamination event in a pool, the disinfection and filtration systems are not prepared for removing such microorganisms. Traditional disinfection is not enough to inactivate or kill such microorganisms, and the filtration system is not suitable for removing them from the water in an appropriate timeframe that ensures that people will not become infected once the contamination takes place. In particular, due to conventional swimming pool technologies requiring filtering the complete volume of water in the pool—which is a time consuming process that does not even allow the complete filtering of all oocysts in an appropriate timeframe—together with the fact that chlorine may not inactivate all oocysts of certain microorganisms in a period shorter than 10 days. Accordingly, if a contamination event occurs in the pool, such microorganisms may go undetected and infect many bathers before it is properly treated and eliminated from the pool water.

Therefore, swimming pools are prone to RWIs triggered by microorganisms such as bacteria, protozoa, amoebas, microalgae and parasites, amongst others present in the water which can have high resistance to conventional swimming pool water treatment methods, and therefore can potentially reach bathers either by swallowing the water, breathing the re-suspended microorganisms, or simply by having direct contact with the water.

One study from the United States Centers for Disease Control and Prevention (CDC) summarized 90 reports of recreational water illnesses outbreaks that occurred during 2011 and 2012 from 32 states and Puerto Rico, where 69 outbreaks (76.6%) were found in conventionally treated swimming pools. Additionally, a 2007 study from the CDC summarized the overall 78 recreational water illnesses outbreaks reports that occurred during 2005-2006, which accounted for illnesses occurring in 4,412 people, resulting in 116 hospitalizations and five deaths. Of those 78 outbreak reports, 31 (40%) were caused by *Cryptosporidium*. Another study showed that in June 2003, an outbreak of *Giardia intestinalis* started at a Massachusetts membership club pool, which resulted in 149 cases, including cases of secondary person-to-person transmission. Also, in July 2003, a *Cryptosporidium* outbreak spread in multiple Kansas pools and day care centers and resulted in 617 cases. This last outbreak was the largest recreational water outbreak during 2003-2004. Further, in July 2004, an outbreak of *Cryptosporidium* in a community pool in Ohio caused gastroenteritis in 160 people from three counties, and in August 2004, employees ill with gastroenteritis at a California water park continued performing working and recreational activities in the pools, resulting in a *Cryptosporidium* outbreak that involved 336 people with related illnesses.

Further, in 2008, the CDC reported that RWIs cases caused by *Cryptosporidium* in the U.S. had tripled since 2004. However, this increase may have been influenced by more advanced detection methods, e.g., meaning that previous cases may have existed but went undetected. More recently, data collected during 2013-2014 from the CDC indicates that there were more than 71 outbreak cases from swimming pools reported in the U.S., resulting in more than 950 cases. From 2000-2014, more than 450 outbreaks have been reported, resulting in more than 27,000 cases, where more than half of such cases were due to *Cryptosporidium*.

The above described cases reinforce the fact that some microorganisms such as *Cryptosporidium* and *Giardia*, among others, are not eliminated effectively through conventional swimming pool treatment methods or systems. Therefore, while is a common belief that RWIs are a risk only in untreated water bodies, most of the cases where RWIs have resulted in several people becoming ill have taken place in conventionally treated water bodies such as swimming pools, which highlights the need of improved methods and systems to treat and maintain water bodies for recreational purposes.

In addition to contamination due to microorganisms such as *Cryptosporidium* and *Giardia*, swimming pools are prone to RWIs caused by amoebas present in the water body. For example, a 2003 study performed in Santiago, Chile found that five out of eight public swimming pools had free living amoebas during the summer period, and that *Naegleria Fowleri* and *Acanthoamoebas* were present in 36.3% of the samples. Further, such study reported that one of said public swimming pools where no free living amoebas or microorganism were found, had an extremely high chlorine concentration which made the surrounding air unbreathable and caused eye irritation (especially because it was an indoor pool with poor air circulation).

More recently, in Spain, a 10-year-old girl from the province of Toledo recovered from the first case recorded in Spain of primary amoebic encephalitis (PAM) caused by *Naegleria Fowleri*, which was contracted in a public swimming pool treated and maintained with standard swimming pool technology. Primary amoebic meningitis (PAM) is an extremely aggressive disease that causes severe headache, fever and neck stiffness for several days and that leads to death in 97% of detected cases. This case astonished doctors and health officials because the public swimming pool in which the girl contracted the disease complied both with the chlorine levels and filtration standards that are considered safe.

Currently, if a contamination event of these types occurs in a swimming pool, there are generally one of two outcomes:

If the contamination event goes undetected, which usually happens, then the microorganisms will remain and spread in the water, potentially infecting many bathers (even though the water is being treated by the conventional pool system), which means that there could be more than 10 days of exposure of bathers to the dangerous microorganisms. Also, as emphasized before, conventional pool filtration systems take a long time to remove oocysts from the water since there is partial filtration, and in some cases due to their sizes, the oocysts cannot be removed at all.

If the contamination event is detected, in order to inactivate and remove oocysts it is necessary to close the pool for several days and sometimes even drain the entire complete pool volume, which rarely happens. Alternatively, the swimming pool can go through a process of hyperchlorination, which requires an extremely high chlorine concentration that as described above, can make the surrounding air unbreathable as well as causing eye and skin irritation.

In conclusion, conventional swimming pool technologies, which combine disinfection and filtration processes are not prepared for treating some microorganisms, like *Cryptosporidium* and *Giardia* amongst others, which makes it difficult to ensure that the water, which is used for direct recreational purposes, is free of disease-causing microorganisms. Conventional pool systems are slow or ineffective in eliminating microorganisms of these types, even though they comply with the required local regulations.

B. Larger Water Bodies

As mentioned above, there are also larger water bodies, such as swimming lakes used for direct contact purposes, that are somewhat treated. These water bodies are also prone to high risks associated to the presence of microorganisms such as bacteria, protozoa, amoebas, microalgae and parasites, amongst others. In some cases, fatalities occur after a person becomes infected.

Generally, such large water bodies are partially treated using methods that essentially consist of reduced applications of conventional swimming pool technologies. Thus, when these water bodies are treated, the disinfectant levels and filtration levels are typically much lower than required in conventional swimming pools. For example, instead of maintaining a permanent 1 ppm of free chlorine in the complete water volume (as a conventional swimming pool), such large water bodies maintain much lower levels and not necessarily permanently, and instead of filtering the complete water volume from four to six times per day (as it is required in a conventional swimming pool), the water volume is partially filtered and/or with less periodicity. This partial disinfection and filtration is applied in such large water bodies mainly due to economic reasons, since the use of conventional swimming pool technologies in large water bodies would require very high capacity systems and equipment costs, as well as high operation costs related to the large amount of required chemicals and electricity for filtration purposes.

It is also important to note that such partially treated swimming lakes generally have poor water clarity. This is in contrast to the transparency and crystal clear conditions of conventional swimming pools, which is mainly the result of a partial filtration of the water volume.

When dealing with confined recreational water bodies, such as partially treated larger man-made lakes and lagoons, or similar, it is important to note that when they are not treated with conventional swimming pool technology, important sanitary risks might be generated. For example, there have been many accidents caused by dangerous microorganisms in confined man-made large water bodies that were not treated using traditional swimming pool technologies, but were instead using a partial application of the technology.

A representative case is the one at Disney's River County, where an 11-year-old boy died from *Naegleria Fowleri*, which he contracted while swimming in their artificial lagoon. Another case happened at North Carolina's National Whitewater Center, where an 18-year-old woman died about a week after contracting the amoeba while rafting at the center.

Another recent accident happened in an artificial surf lake located in Waco, Tex., which did not use conventional pool technology but instead used a partial disinfection and filtration. In this accident, a 29-year-old surfer contracted the *Naegleria Fowleri* amoeba and died on Sep. 21, 2018. Even though this accident had fatal consequences, when the water quality analyses were performed on Sep. 27, 2018, the amoeba was not found in the surf lake, but was found in nearby water bodies. Therefore, it is very important to highlight that a simple water quality analysis is usually not adequate for preventing these types of accidents, since these microorganisms can be present in specific sectors within the water bodies and/or located in corners.

As an indication of the size of the problem, there have been more than 140 registered cases in the U.S. of the *Naegleria Fowleri* amoeba, with a 97% mortality rate.

The *Naegleria Fowleri* enters the organism through the nose, from where it travels to the central nervous system and generates an acute brain inflammation and eventually leading to a Primary Meningoencephalitis (PAM), a brain infection that leads to the destruction of brain tissue. For this reason it is sometimes referred to as the "brain eating amoeba". Meningoencephalitis has an incubation period of between two and eight days, and in almost all cases results in the death of the infected patient.

Acanthoamoebas, on the other hand, enter the human body through the eyes or skin cuts, travelling to the central nervous system and with an incubation period of only a few days. In the latter case, most of cases end with a fatal outcome.

Both amoebas and acanthoamoebas are particularly dangerous where they are present in water bodies having strong currents or a constant water movement that generates a resuspension of sediments accumulated on the bottom surface of the water bodies. The resuspension increases the chances for the bacteria to reach the nose and eyes of bathers.

Monitoring the amoebas through water quality analysis is extremely complex and requires specific knowledge. Also, it is not enough to perform a few water samples in different locations within the water bodies, as such analysis would not help to conclude the same results for other locations as previously mentioned. Such amoebas can be present in certain locations within the water bodies, hidden in corners or in bottom sediments. Therefore, the detection of these amoeba require training, specific analysis and controls—all of which illustrate the need for a system and method for properly treat recreational use swimming lakes to avoid or minimize such risks.

Therefore, today there are no methods or systems that provide complete sanitary safety in conventional swimming pools or in partially treated larger water bodies that are used for recreational purposes. Conventional systems, even for swimming pools, would require very high levels of disinfectants, which apart from being extremely cost consuming, can generate a toxic environment and non-safe conditions for bathers and bystanders. In addition, it has been shown that even when all the standards that are generally considered safe in a swimming pool are met, RWI's may still occur.

C. Disinfection Index

The patterns and requirements through which swimming pools or larger water bodies are treated and maintained, are conventional swimming pool requirements, and bacteriological standards from the U.S.E.P.A., among others. However, these standards may sometimes not be enough to guarantee that there will be no sanitary risks due to the presence of microorganisms such as bacteria, protozoa, amoebas, microalgae and parasites amongst others in the water.

One manner of applying proper disinfection to inactivate different microorganisms such as bacteria, protozoa, amoebas, microalgae and parasites amongst others is the use of the CT index. This index results from a specific concentration of a disinfectant "C" and the amount of time "T" that the disinfectant is in contact with the water at such specific concentration in order to achieve a suitable disinfection. The CT index is therefore determined by multiplying both values, as may be seen in the following equation:

$$CT = \text{Concentration of disinfectant} \left[\frac{mg}{L}\right] \times \text{Contact Time [min]}$$

Different CT values allow for the inactivation of different microorganisms, parasites, and protozoa, based on the type of disinfectant used, the temperature and pH of the water, and the level of inactivation required. The following Table 1 illustrates CT values for the inactivation of microorganisms.

TABLE 1

|  | Disinfectant | Inactivation | Temperature | CT Value $\left[\frac{mg}{L} \times min\right]$ |
| --- | --- | --- | --- | --- |
| *Giardia* Cysts | Ozone | 1 log | 10° C. | 0.48 (6 < pH < 9) |
| *Giardia* Cysts | Ozone | 1 log | 25° C. | 0.16 (6 < pH < 9) |
| *Giardia* Cysts | Chlorine | 1 log | 10° C. | 112 (For pH = 7) |
| *Giardia* Cysts | Chlorine | 1 log | 10° C. | 162 (For pH = 8) |
| *Cryptosporidium* | Chlorine | 3 log | 25° C. | 15,300 (pH < 7.5) |
| *Naegleria Fowleri* (Trophozoites) | Chlorine | 3 log | 25° C. | 9 (For pH 7.5) |
| *Naegleria Fowleri* (Trophozoites) | Chlorine | 3 log | 25° C. | 23 (For pH 9) |
| *Naegleria Fowleri* (Cysts) | Chlorine | 3 log | 25° C. | 42 (For pH 7.5) |
| *Naegleria Fowleri* (Cysts) | Chlorine | 3 log | 25° C. | 50 (For pH 9) |

Inactivation is measured as 1 log, 2 log, 3 log or 4 log, as illustrated in the following Table 2:

TABLE 2

| 1 log | 90% Inactivation |
| --- | --- |
| 2 log | 99% Inactivation |
| 3 log | 99.9% Inactivation |
| 4 log | 99.99% Inactivation |

In general, bacteria are easily inactivated, while microorganisms like *Giardia intestinalis* and *Cryptosporidium* among others, are very difficult to inactivate. For example, the 1 log inactivation of *Giardia* Cysts at a temperature of 10° C. and at a pH of 7 requires a CT value of 112. This means that the following disinfection alternatives can be used:

A concentration C of 1 ppm can be used for a time T of 112 minutes, achieving a CT of 112

$$CT = 1 \left[\frac{mg}{L}\right] \times 112 \text{ [min]} = 112 \left[\frac{mg}{L} \times \min\right]$$

A concentration C of 2 ppm can be used for a time T of 56 minutes, achieving a CT of 112

$$CT = 2 \left[\frac{mg}{L}\right] \times 56 \text{ [min]} = 112 \left[\frac{mg}{L} \times \min\right]$$

Thus, from the above example, it will be appreciated that to achieve the same CT value, a higher concentration C results in a lower application time T.

Proper disinfection must be achieved in recreational water bodies to provide safe sanitary conditions for direct contact purposes. Even though some microorganisms are easily inactivated by conventional pool disinfection levels, there are microorganisms that are resistant to conventional disinfection and filtration methods, and therefore require other types of treatment for providing a sanitary-safe water body.

Therefore, there arises a need for a water treatment system and method that allows for minimizing the risk of contamination in large water bodies from microorganisms that are commonly found in recreational waters, such as bacteria, protozoa, amoebas, microalgae and parasites, amongst others, by solving the inefficiencies current methods and systems in an innovative manner and at low costs.

SUMMARY

The present invention provides a system and method for treating a large body of water in order to make the water suitable for recreational purposes.

Methods and systems according to the principles of the invention provide a low cost sanitary system and method that minimize the risks of contamination of microorganisms such as bacteria, protozoa, amoebas, microalgae and parasites, among others. Such system and method may be employed in swimming lakes and man-made large water bodies, among others.

In either case, the principles of the invention include designating two different treatment zones in the large body of water. The two zones have different configurations and treatment methods. The first zone is a sedimentation zone. This zone is used mainly to provide treatment and settling of microorganisms and/or contaminants to inactivate and/or remove them from the water body. The second zone is a dissipation zone. This zone is where the main direct contact recreational water activities are intended to occur. In this dissipation zone, a water flow is established that along with the natural currents produced by winds and/or water temperature differences, allow generating a water dissipation pattern of the volume of water within the dissipation zone 2 into the sedimentation zone 1. In addition, continuous disinfection of the water volume in the dissipation zone is provided.

Therefore, according to a first aspect of the invention, there is provided a low cost and sanitary efficient method for providing large water bodies for direct contact recreational purposes, of at least 3,000 m², the method comprising: designating a sedimentation zone 1 and a dissipation zone 2 in the large water body, applying a disinfection method based on a CT index and applying an efficient amount of a flocculant composition into the sedimentation zone 1 that aids in the settling of different microorganisms and/or contaminants that are present in the sedimentation zone 1, and minimally disturb the water volume within the sedimentation zone, whereby disturbance to the sedimentation process is minimized; maintaining a permanent chlorine residual in the dissipation zone 2 water volume by adding an efficient amount of a chlorine disinfectant into the dissipation zone 2 so that at least a 0.5 mg/L free chlorine level is maintained in the water volume contained within the dissipation zone 2; injecting water to the dissipation zone by means of one or more inlet nozzles that along with the natural currents produced by winds and/or water temperature differences, allow generating a water dissipation pattern of the volume of water within the dissipation zone 2 into the sedimentation zone 1, and wherein the dissipation zone 2 is configured and arranged to allow a Contamination Reduction Index (CRI) of up to 30 minutes.

According to further aspects according to the method described in the preceding paragraph, the sedimentation zone 1 and the dissipation zone 2 are not separated by a physical barrier and the ratio between the water volume within the dissipation zone and the water volume within the sedimentation zone is from 1:2 to 1:40. The method further comprises designing the sedimentation zone so that, as a daily average, no more than 20% of the total number of bathers utilizing the large water body are present in the sedimentation zone 1, and wherein the sedimentation zone 1 is intended mainly for secondary non-direct recreational contact purposes; further comprising designing the dissipation zone for direct contact purposes such as swimming; and/or further comprising designing the dissipation zone so that as a daily average, 80% or more of the swimmers utilizing the large water body are present in the dissipation zone 2.

It will be appreciated that the large water bodies with which the principles of the present invention may be utilized, include existing water bodies (such as swimming lakes) or water bodies that are constructed.

According to a second aspect of the invention, there is provided a system for establishing a large water body suitable for direct contact recreational purposes, the large water body of the type covering at least 3,000 m², and having a periphery 12 and a bottom, comprising: a sedimentation zone 1 located within a portion of the large water body 3 and along a portion of the periphery 12; a system for dosing chemicals 19 within the sedimentation zone arranged and configured to apply: i) disinfectant agents in the water volume within the sedimentation zone to achieve a CT index of at least 42 every 72 hours, where C is defined as the concentration and T is defined as the minimum contact time, and ii) flocculant agents into the sedimentation zone that aid in the settling process of the different microorganisms, parasites, and protozoa that are present in the water body and inactivated by the CT cycle; a dissipation zone located within a portion of the large water body and along a portion of the periphery 12; a system for dosing chemicals 29 into the dissipation zone configured to maintain a permanent chlorine residual in the water volume within the dissipation zone water, wherein at least a 0.5 mg/L free chlorine level is maintained in the water volume located within the dissipation zone; and one or more inlet nozzles 26 throughout the dissipation zone 2 within the dissipation zone arranged and configured to inject water to the dissipation zone, which along with the natural currents produced by winds and/or water temperature differences, allow generating a water dissipation pattern of the volume of water within the dissipation zone 2 into the sedimentation zone 1 and minimally disturb the water volume within the sedimentation zone, whereby disturbance to the sedimentation process is minimized.

The advantages and features which characterize the inventions are pointed out with particularity in the claims annexed hereto and forming a part hereof. For a better understanding of the inventions, however, reference should be had to the drawings which form a part hereof and to the accompanying descriptive matter, in which there is illustrated and described preferred embodiments of the inventions.

BRIEF DESCRIPTION OF THE DRAWINGS

Referring to the drawings, wherein like numerals represent like parts throughout the several views.

DETAILED DESCRIPTION

Figure 1:
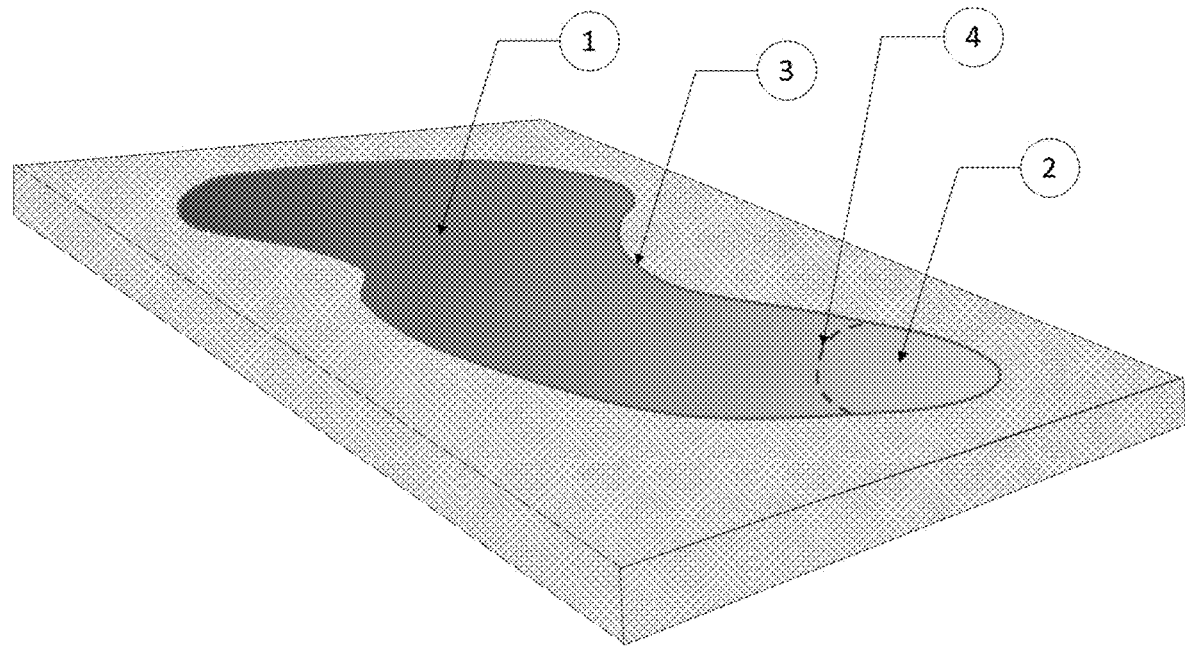
FIG. 1 illustrates one example embodiment of a large water body comprising two separate zones, a sedimentation zone 1 and a dissipation zone 2.

The following detailed description refers to the accompanying figures. While embodiments of the invention may be described, modifications, adaptions, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the scope of the invention.

The present invention relates to a low cost and sanitary efficient method for providing large water bodies with two different treatment zones for direct contact recreational purposes.

The low cost and sanitary efficient method of the present invention addresses the technical inefficiencies of conventional swimming pool technologies in maintaining safe and sanitary conditions in water bodies by combining the technical features of a dissipation zone 2 for direct contact recreational purposes, which has a particular and efficient water dissipation pattern as well as a minimum permanent concentration of a chlorine disinfectant, together with a sedimentation zone 1 that is intended mainly for secondary non-direct recreational contact purposes, which is not physically separated from the dissipation zone 2 and is configured to inactivate, flocculate and eliminate dangerous microorganisms previously dissipated from the dissipation zone 2.

As described herein, the combined disinfection methods, efficient diffusion patterns and sedimentation capacity of the water bodies according to the present invention create unprecedented safer environments for water recreational purposes that have not been described nor applied before and that solve the inefficiencies of conventional swimming pool technologies and those of partially treated large water bodies, allowing thus the creation of recreational water bodies that minimize the risk of infections caused by microorganisms (e.g., such as bacteria, protozoa, amoebas, microalgae and parasites, among others), thus solving the inefficiencies of current methods and systems in an innovative manner and at low costs.

In the context of the present invention, direct contact recreational activities involve repeated or continuous direct contact of bathers with the water, involving a significant risk of ingestion of water, such as swimming, water skiing, diving, surfing and wading by children. On the other hand, secondary contact or non-contact recreational uses do not involve the direct contact of bathers with water and therefore do not involve a significant risk of water ingestion, such as fishing, or boating activities.

The method of the present invention allows inactivating and/or removing contaminants and/or microorganisms from large water bodies, where such microorganisms can come from the air, water sources, external contamination, or more likely from bathers that access the water body who are carrying such contaminants.

More specifically, the present invention relates to a low cost and sanitary efficient method for providing large water bodies suitable for direct contact recreational purposes, wherein the method is defined, inter alia, by:

designating a sedimentation zone 1 and a dissipation zone 2 in the large water body, both having different configurations and treatment methods, wherein the sedimentation zone 1 and the dissipation zone 2 are located within the same water body 3, and are not separated by a physical barrier, the sedimentation zone 1 can have a second purpose (e.g., in addition to functioning as the sedimentation zone), that is an aesthetic purpose and is intended mainly for secondary non-direct recreational contact purposes, and is therefore designed to have a density of bathers lower than the dissipation zone 2, the dissipation zone 2 is used for direct contact purposes, such as swimming and bathing, and is designed to have a high density of bathers, applying a disinfection method based on a CT index into the sedimentation zone 1 water volume, applying an efficient amount of a flocculant composition into the sedimentation zone 1 that aids in the settling of different microorganisms and/or contaminants that are present in the sedimentation zone 1, and wherein water flows and water circulation within the sedimentation zone 1 are maintained to allow proper sedimentation, preferably water flows and water circulation within the sedimentation zone 1 are maintained at a minimum, whereby disturbance to the sedimentation process is minimized;

maintaining a permanent chlorine residual in the dissipation zone 2 water volume, and injecting water to the dissipation zone 2 by means of one or more inlet nozzles that along with the natural currents produced by winds and/or water temperature differences, allow generating a water dissipation pattern of the volume of water within the dissipation zone 2 into the sedimentation zone 1, and wherein the dissipation zone 2 is configured to allow a Contamination Reduction Index (CRI).

More specifically, the present invention also relates to a system for establishing a large water body 3 suitable for direct contact recreational purposes, wherein the system comprises:

a) a sedimentation zone 1 located within a portion of the large water body 3 and along a portion of the periphery;

b) a system for dosing chemicals along the periphery within the sedimentation zone 1 arranged and configured to apply:

i) disinfectant agents in the water volume within the sedimentation zone 1 to achieve a CT index of at least 42 every 72 hours, where C is defined as the concentration and T is defined as the minimum contact time; and ii) a flocculant composition into the sedimentation zone 1 that aids in the settling process of the different microorganisms, parasites, and protozoa that are present in the water body and inactivated by the CT cycle;

c) a dissipation zone 2 located within a portion of the large water body and along a portion of the periphery;

d) one or more inlet nozzles 26 along the periphery within the dissipation zone 2 arranged and configured to inject water to the dissipation zone 2 to generate a diffusion pattern of the water volume within the dissipation zone, e) a system for dosing chemicals 29 into the dissipation zone 2 configured to maintain a permanent chlorine residual in the water volume within the dissipation zone water, wherein at least a 0.5 mg/L free chlorine level is maintained in the water volume located within the dissipation zone.

The large water bodies with which the principles of the present invention may be practiced, can be natural or artificial water bodies and can have a surface area of at least 3,000 m², more preferably at least 8,000 m² and even more preferably at least 12,000 m² and most preferably at least 24,000 m².

In reference to FIG. 1, two different zones are designated within the large water body 3, a first sedimentation zone 1 and a second dissipation zone 2 both having different configurations, disinfection methods, cleaning requirements, and dissipation conditions.

Both zones are located within the same large water body 3, and are not separated by a physical barrier, as the dissipation zone 2 is open into the sedimentation zone 1. Both zones may be delimited by the use of a delimitation means or device 4. Therefore, in an embodiment of the invention, a delimitation means 4 separates the sedimentation zone 1 and the dissipation zone 2. The means of delimitation 4 according to the invention may be selected from the group comprising a visual delimitation, overhead flags, a series of buoys, a flotation line, a delimitation line, a slope change, different depths and combinations thereof, among others. In other embodiments, the approximate location of the means of delimitation can be established by other means such as in a brochure, designations by signage or rules, a handbook, a user guideline and by written and/or verbal instructions, among others.

According to the invention, the ratio between the volume contained within the dissipation zone 2 and the volume contained within the sedimentation zone 1 is preferably 1:2, more preferably 1:10, even more preferably 1:30 and most preferably 1:40.

The sedimentation zone 1 is configured to provide treatment and settling of contaminants and/or microorganisms such as bacteria, protozoa, amoebas, microalgae and parasites, amongst others in order to inactivate and remove them from the water body 3. The sedimentation zone 1 includes specific features that allow an efficient sedimentation of the suspended contaminants and microorganisms and avoiding their resuspension, including: (a) it has a defined depth, (b) it is designed to have a limited density of bathers, (c) it includes a disinfection treatment based on a CT index, (d) it includes the application of flocculants to aid in the settling of microorganisms and/or contaminants, and (e) it has a defined surface that ensures maintaining a calm water body to minimize water flows and water circulation that may interfere with the settling process. The above features are described in detail below:

a) A defined depth: The sedimentation zone 1 is designed so that its depth allows an efficient settling of the microorganisms. In an embodiment of the invention, the depth of the sedimentation zone 1 is at least 1.8 meters at its deepest point, which contributes in preventing bathers from stepping over the bottom surface of the sedimentation zone which might cause the re-suspension of microorganisms and impurities that have already settled on the bottom of the sedimentation zone 1. In other embodiments of the invention, the depth of the sedimentation zone 1 is at least 2 meters at its deepest point, and preferably at least 2.2 meters at its deepest point.

b) A limited density of bathers: The sedimentation zone is intended mainly for secondary non-direct recreational contact purposes; and due to its depth, potential bathers that want to access and stay in such zone would tend to go back to the dissipation zone 2 which is suitable for direct contact recreational purposes, and therefore the sedimentation zone 1 is designed so the that density of bathers in such sedimentation zone is limited to less than 20% of the total bathers present in the large water body 3 and more preferably less than 10% of the total bathers present in the large water body 3. Such 20% and 10% of the total bathers are calculated as a daily average, taking in account the total number of bathers that enter the water body 3.

c) A disinfection treatment based on a CT index: The sedimentation zone 1 is treated based on a CT index, wherein the CT can be determined to be the one suitable to inactivate most dangerous microorganisms such as *Naegleria Fowleri*, *Giardia* or *Cryptosporidium*, among others. The disinfection treatment based on a CT index requires that the sedimentation zone 1 is treated by adding disinfectant agents to achieve a specific concentration "C" during a minimum contact time of "T" in the complete water volume of the sedimentation zone 1. In a preferred realization of the invention, a disinfection method is performed such that disinfectant agents are applied to the water volume contained in the sedimentation zone 1 to achieve a CT index of at least 42 every 72 hours, since the same has proven to be a CT index that provides safe and sanitary conditions in order to inactivate not only *Naegleria Fowleri* but other dangerous microorganisms that are present in recreational water bodies.

It is important to emphasize that some microorganisms, such as the *Naegleria Fowleri*, do not survive in seawater or salty water. Nonetheless, if the water body 3 according to the present invention contains seawater, salty water or a combination thereof, the sedimentation zone 1 is in any case configured so that disinfectant agents are applied to achieve a CT index of at least 42 every 72 hours. In other embodiments of the invention, disinfectants agents are applied to achieve a CT index according to any of those indexes listed in Table 1, or other defined accordingly, in a timeframe of at least 24 hours, preferably at least 48 hours and even more preferably of up 72 hours.

d) Application of flocculants: The sedimentation zone 1 is treated with a flocculant composition that aids in the settling process of contaminants and/or microorganisms that are present in the water body and that may have been inactivated through the CT cycles.

In an embodiment of the invention, the flocculant composition comprises one or more flocculant agents selected from the group comprising organic and inorganic flocculants. Preferably, the flocculant agents are selected from inorganic flocculants comprising synthetic polymers, quaternary ammonium cationic polymers, polycationic polymers, aluminum salts, calcium oxide, calcium hydroxide and mixtures thereof.

In an embodiment of the invention, the flocculant agents are preferably selected from the group comprising a cationic or anionic polymeric flocculant and are preferably added to the sedimentation zone 1 at least once every 7 days at a rate of 0.03 g to 3.0 g per m$^3$ of water volume of the sedimentation zone 1.

e) A large surface: The sedimentation zone 1 has a large surface of at least 1,500 m$^2$, preferably at least 6,000 m$^2$ and even more preferably of at least 10,000 m$^2$, which allows minimizing the effect of water flows and water circulation that can affect the resuspension of settled contaminants from the bottom surface of the sedimentation zone 1.

The dissipation zone 2 according to the present invention is suitable for direct contact recreational purposes and is preferably located nearby the periphery 12 of the water body 3 and is open to the sedimentation zone 1. The dissipation zone 2 is the zone that is designated to have a high density of bathers. The dissipation zone 2 has specific characteristics and conditions to provide a continuous disinfection to the water volume within the dissipation zone 2 and to allow an efficient dissipation of the water into the sedimentation zone 1. The dissipation zone is therefore defined by the following three main technical features:

a) A continuous disinfection: A permanent chlorine residual is maintained in the dissipation zone 2, where such zone is disinfected so that at least a 0.5 mg/L free chlorine level is maintained in the water volume contained within the dissipation zone. According to the main embodiment of the invention, chlorine is the preferred disinfectant agent to be applied into the dissipation zone, however, other type of disinfectants that achieve suitable disinfection parameters can also be used, such as bromine, ozone, its derivatives and mixtures thereof.

b) A specific depth and geometry: The dissipation zone 2 is designed so that it has a design and depth that is suitable for bathers accessing and entering the dissipation zone. In an embodiment of the invention, the dissipation zone has a downward slope and a depth of 1.4 meters at its deepest point. Preferably, the dissipation zone comprises a downward slope from the periphery 12 to the bottom surface at an angle a that results in a slope of up to 15% to achieve a safe entry to the large water body, and so that it is suitable for bathers to stay in such area. In an alternative embodiment, the dissipation zone 2 is designed so that it has a depth of 1.6 meters at its deepest point, and more preferably 1.8 meters at its deepest point.

c) One or more inlet nozzles: The dissipation zone 2 comprises one or more inlet nozzles 26 located within such zone in order to provide a water flow into the dissipation zone 2, that along with the natural influence of water currents produced by winds and/or the horizontal and vertical water temperature differences in the water body, will cause water movement and renewal of such water volume contained in the dissipation zone 2 that is open to the sedimentation zone 1. In an embodiment of the invention, the location, design and configuration of the one or more inlet nozzles 26 can vary to achieve different types of water renewal patterns within the dissipation zone. The one or more inlet nozzles 26 can be located along any section of the dissipation zone, such as its periphery and/or center. In a particular embodiment, the one or more inlet nozzles 26 can be configured to add an efficient amount of a chlorine disinfectant into the dissipation zone in order to maintain a free chlorine concentration of at least 0.5 mg/L free chlorine level is described in (a).

The dissipation zone 2 is the zone that is designated to have a high density of bathers, where at least 80% and more preferably at least 90% of the total number of bathers within the large water body 3 is present in the dissipation zone 2 with a maximum density of 1 bather per 2 m2, preferably a maximum density of 1 bather per 4 m$^2$, more preferably a maximum density of 1 bather per 6 m$^2$ and most preferably a maximum density of 1 bather per 8 m$^2$. Such 80% and 90% are calculated as a daily average, taking in account the total number of bathers that enter the water body 3, and where at least 80% and more preferably 90% of such bathers are located in the dissipation zone 2.

The combination of the above zone elements relating to depth, geometry and one or more inlet nozzles 26 together with the natural influence of water currents produced by winds and/or the horizontal and vertical water temperature differences in the water body, will cause water movement and the dissipation of water volume contained in the dissipation zone 2 into the sedimentation zone 1, in addition to provide a continuous disinfection within said dissipation zone 2 as described in (a).

It has been surprisingly found that the low cost and sanitary efficient method of the present invention addresses the technical inefficiencies of conventional swimming pool technologies in maintaining safe and sanitary conditions in large water bodies by combining the technical features of a dissipation zone 2 for direct contact recreational purposes, having a particular and efficient water dissipation pattern as well as a minimum permanent amount of a disinfectant, which in the event of a contamination event can safely and timely inactivate and dissipate dangerous microorganisms to a sedimentation zone 1 that is intended mainly for secondary non-direct recreational contact purposes, wherein said sedimentation zone 1 is not physically separated from the dissipation zone 2 and which is configured to inactivate microorganisms by means of a CT disinfection method, as well as to flocculate and eliminate them in an efficient, safe manner at low costs.

There are currently no methods or systems that can address the technical inefficiencies of conventional swimming pools in an efficient and low cost way for large water bodies as the ones of the present invention, which combine the effects of an efficient water dissipation pattern and minimum disinfection standard in the zone that is aimed for direct contact recreational purposes, with a sedimentation zone 1 that is configured to inactivate, flocculate and eliminate contaminants and/or dangerous microorganisms previously dissipated from a dissipation zone. Even though some larger water bodies, such as natural swimming lakes are able to somewhat recreate a dissipation pattern, they lack the technical features of the present invention, namely: a dissipation zone 2 having a permanent minimum concentration of a disinfectant and a particular and efficient dissipation pattern as well as a sedimentation zone 1 that combines the application of a CT disinfection method with the application of flocculant agents that allow a proper inactivation and elimination of contaminants and/or microorganisms to maintain a sanitary and safe zone for recreational water purposes.

Therefore, the combined disinfection methods, efficient diffusion pattern and sedimentation capacity of the water bodies according to the present invention create unprecedented safe environments for water recreational purposes that have not been described nor applied before and that solve the inefficiencies of conventional swimming pool technologies and those of partly treated large water bodies, allowing thus the creation of recreational water bodies that minimize the risk of infections caused by microorganisms such as bacteria, protozoa, amoebas, microalgae and parasites, amongst others, solving thus the inefficiencies of current methods and systems in an innovative manner and at low costs.

As previously mentioned, the dissipation zone 2 is configured to create an efficient diffusion pattern of the volume within the dissipation zone 2 due to the combined effect of the one or more inlet nozzles 26 that inject a water flow into such zone along with the natural influence of water currents produced by winds and/or the horizontal and vertical water temperature differences of the water body, which creates a water flow and efficient diffusion pattern within the dissipation zone 2 that forces such water volume to leave the dissipation zone 2 and cross over to the sedimentation zone 1. The circulation created by the one or more inlet nozzles 26 and the natural influence of water currents produced by winds and/or the horizontal and vertical water temperature differences in the water body, contribute to generate a dissipation rate in such dissipation zone 2, as the water flows that enter such zone push the water volume into leaving the dissipation zone 2 and reaching the sedimentation zone 1. Therefore, there is a dissipation pattern that allows renewing the water volume contained within the dissipation zone 2 based on the configuration and capacity of the one or more inlet nozzles 26, on the natural influence of water currents produced by winds and/or the horizontal and vertical water temperature distribution in the water body, as well as on the presence of an open hydraulic connection to the sedimentation zone.

In certain embodiments of the invention, the water body may be subject to stronger winds that can influence the dissipation pattern within the dissipation zone. In such a case, the circulation created by the one or more inlet nozzles within the dissipation zone can be adjusted as necessary to maintain a suitable dissipation pattern. For instance, where winds positively influence the dissipation pattern within the dissipation zone, the water flow from the one or more inlet nozzles can be minimized or suppressed entirely if the dissipation pattern created by the winds is sufficient to generate the necessary dissipation of water volume from the dissipation zone to the sedimentation zone. On the other hand, where winds adversely influence the dissipation pattern within the dissipation zone, the water flow from the one or more inlet nozzles can be adjusted to generate the necessary dissipation of water volume from the dissipation zone to the sedimentation zone This is a clear advantage compared to conventional swimming pools, as swimming pools do not have a separate dissipation zone 2 in order to create a dissipation pattern, and therefore in the method of the present invention by combining a permanent residual disinfectant concentration and an efficient dissipation pattern in the dissipation zone 2, such zone allows to withstand a massive use of bathers without compromising the sanitary quality of such zone due to the fact that in the event of a contamination, the microorganisms can be dissipated in a more efficient and safe way compared to conventional swimming pool.

By having an efficient dissipation pattern, when a contamination event takes place, for example, contamination brought in by new bathers with infectious microorganisms or by other means, said contamination can be dissipated from the dissipation zone 2 into the sedimentation zone 1 for its inactivation and/or removal. In the context of the invention, a contamination event is referred to as any event where organic or inorganic substances that pose a risk to the health of the bathers or microorganisms are brought to the water body.

The efficient dissipation pattern of the present invention is different than conventional swimming pools, where any contamination brought in by new infected bathers or by an infection event may remain in the same confined water volume for hours or even longer before it is removed or properly inactivated, causing a potential risk for other bathers. As previously mentioned, certain microorganisms are highly resistant to conventional filtration and disinfection methods of swimming pools, and therefore can survive many hours or even days within the pool water volume before they are removed.

It is important to mention that although the method and system of the present invention do not require filtering the complete water volume at conventional swimming pool rates (i.e. from one to six times per day), the use of conventional filtration systems may be used as an additional treatment to the water body. Such use may be due to local regulatory requirements, or decisions by the owner/developer. The use of a conventional filtration system of the water body is compatible with the method and system of the present invention, however, water flows in the sedimentation zone should allow for proper sedimentation of particles. Such use of a conventional filtration system as an additional treatment to the water body, however, may involve higher construction and operation costs and therefore may be implemented in water bodies having a volume of preferably up to 50.000 m3.

In addition, although it is not required to maintain a permanent free chlorine level in the sedimentation zone, such levels may be required by local regulations or by owner's decisions, which are not incompatible with the method and system from the present invention.

The permanent chlorine level in the dissipation zone 2 can be achieved by the use of chlorine tablets, by applying diluted chlorine through the one or more inlet nozzles 26 located in the dissipation zone 2, or by manually adding chlorine to such zone in an effective amount to maintain at least a 0.5 mg/L free chlorine level.

In an embodiment of the invention, the water injected to the dissipation zone 2 through the one or more inlet nozzles 26 is treated with ultraviolet light (UV).

In an embodiment of the invention, the water body comprises a plurality of separate dissipation zones 2, preferably located along the periphery 12 of the water body 3 and open to the sedimentation zone 1, wherein the dissipation zones 2 are used for swimming, bathing, and other direct contact recreational purposes, whereas the sedimentation zone 1 has an aesthetic purpose and is intended mainly for secondary non-direct recreational contact purposes.

For the sedimentation zone 1, a daily cleaning of the bottom surface to remove settled particles and fallen debris is not essential, since such zone may have a more natural aspect such as natural lakes and lagoons where the bottom surface can have a darker tonality than the bottom in the dissipation zone 2. In a preferred embodiment of the invention, the bottom surface of the sedimentation zone 1 is cleaned at least once every 7-days period. However, other time periods may be employed. In an embodiment of the invention, a bottom surface cleaning device is provided to clean a bottom surface.

The dissipation zone 2 requires a periodic cleaning of the bottom surface in order to maintain the bottom surface of such zones free of particles that may generate an aesthetic, safety, or sanitary impact in the water. Also, such zone must be periodically cleaned in order to prevent any resuspension of settled microorganisms. In a preferred embodiment of the invention, the bottom surface of the dissipation zone 2 is cleaned at least once per every 72-hours period. However, other time periods may be employed.

In an embodiment of the invention, the sedimentation zone 1 is limited to an even lower density of bathers of less than 10% of the total bathers present in the large water body 3. In other preferred embodiments, the sedimentation zone 1 does not allow the presence of bathers for direct contact recreational purposes and is configured to allow only the practice of aquatic sports with secondary contact purposes.

The ratio between the volume contained within the dissipation zone 2 and the volume contained within the sedimentation zone 1 is preferably 1:2, more preferably 1:10, even more preferably 1:30 and most preferably 1:40, wherein such relation is calculated as the sum of all water volumes contained within the dissipation zones 2, divided by the sedimentation zone 1 water volume.

In an embodiment of the invention, the water from the sedimentation zone 1 and that has already been treated, can be extracted from the sedimentation zone 1 and sent to the dissipation zone 2. Such water can be partially or completely mixed with make-up water.

In addition to minimizing the risk of growth of microorganisms, the present invention also eliminates particles and contaminants that are be susceptible to flocculation. In an embodiment of the invention, the flocculant agents can be selected from the group comprising organic and inorganic flocculants. Preferably, the flocculant agents are selected from inorganic flocculants comprising synthetic polymers, quaternary ammonium cationic polymers, polycationic polymers, aluminum salts, calcium oxide, calcium hydroxide and mixtures thereof. Preferably, the flocculants added to the sedimentation zone 1 are selected from the group comprising a cationic or anionic polymeric flocculant and mixtures thereof and are preferably added to the sedimentation zone 1 at least once every 7 days at a rate of 0.03 g to 3.0 g per m3 of water volume of the sedimentation zone 1.

Figure 2:
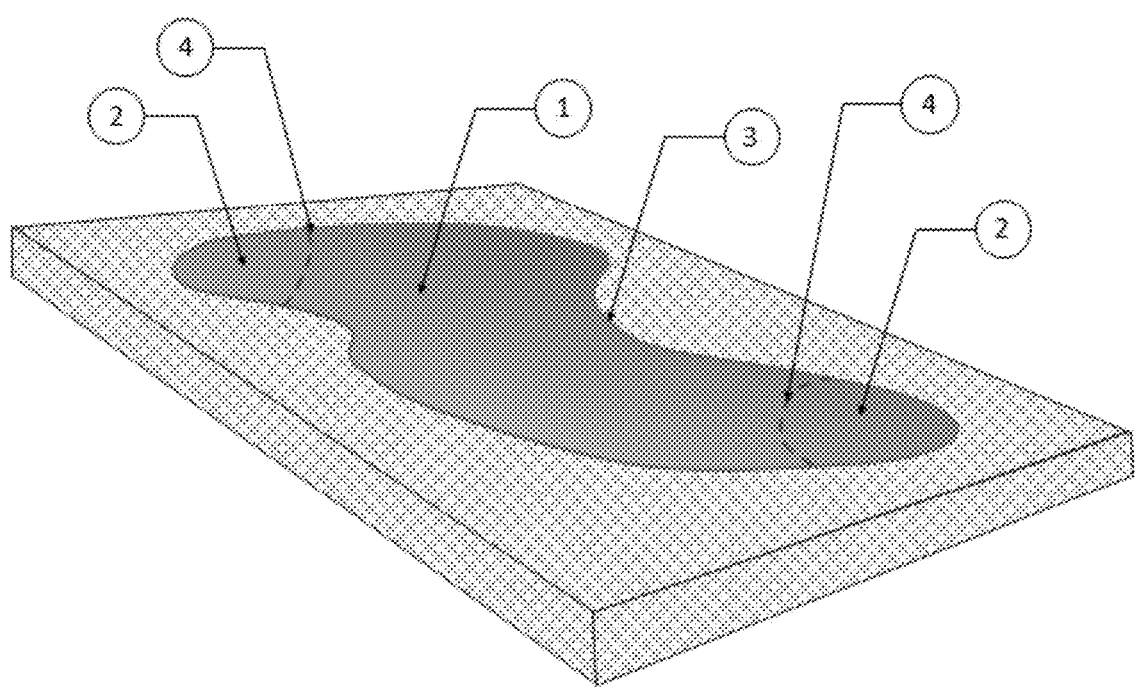
FIG. 2 illustrates one example embodiment of a large water body including a sedimentation zone 1 and two dissipation zones 2.
Figure 3:
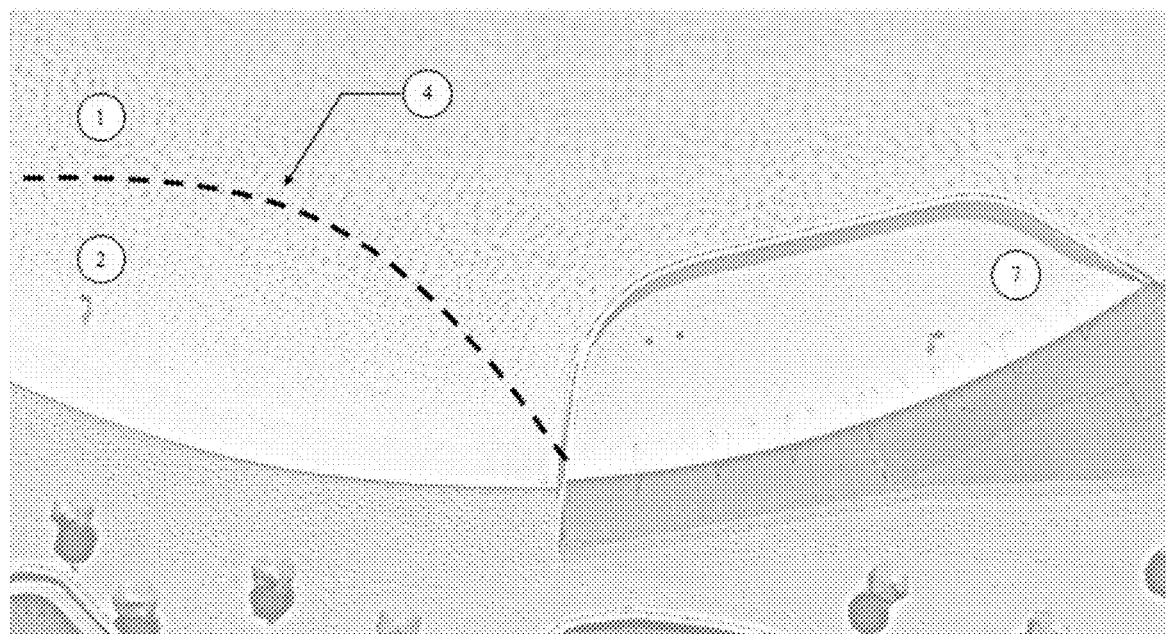
FIG. 3 illustrates shows an enlarged portion of the water body of FIG. 1 showing an embodiment sedimentation zone 1 and dissipation zone 2.
Figure 5:
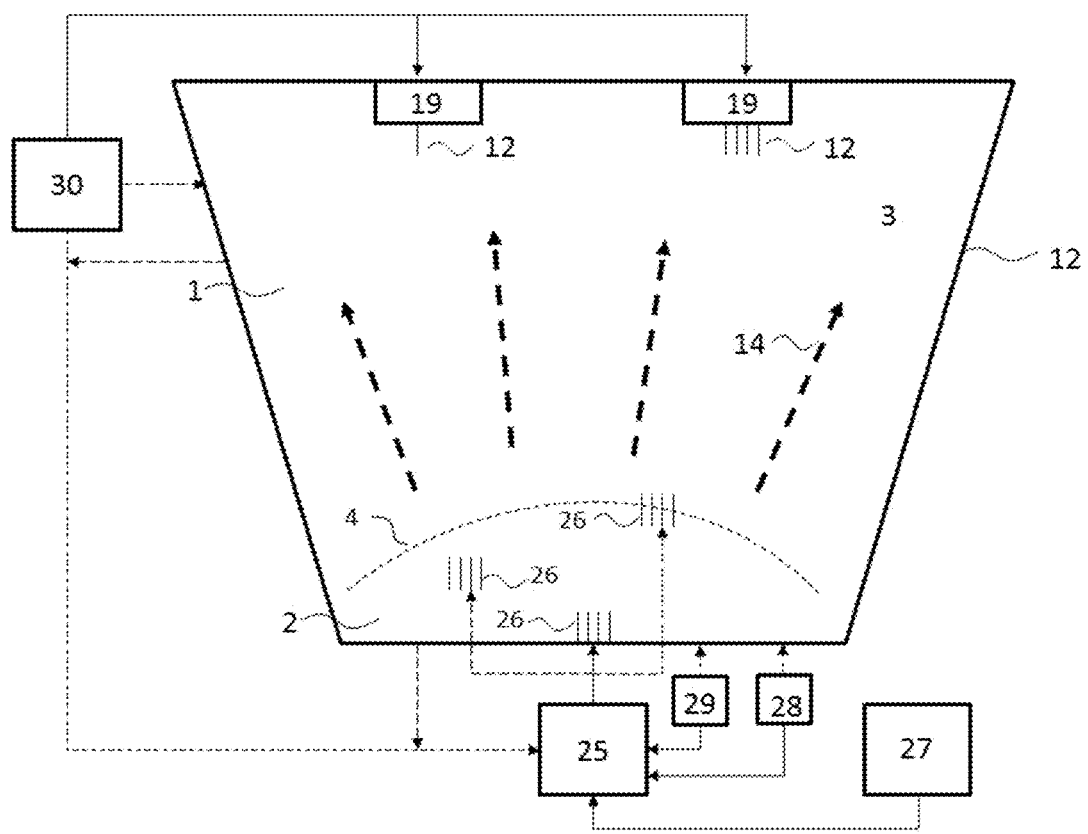
FIG. 5 schematically illustrates a functional block diagram of the various components which may be utilized in an embodiment of the invention.

Turning now to FIG. 5, a functional block diagram illustrating the various components which may be utilized in connection with an embodiment of the present invention is shown. The large water body is shown at designation 3. It will be appreciated that while the shape of the water body in FIG. 5 is shown with four-sided shape, the shape is for illustration only. Other embodiment shapes are illustrated in FIGS. 1-3. The sedimentation zone 1 and dissipation zone 2 are shown as designated portions of the large water body 3. The boundary for the delimitation means 4, which is not a physical barrier, is shown at the meeting point or intersection of the sedimentation zone 1 and dissipation zone 2. The periphery 12 extends about the edge of the large water body 3.

Input water to pump 25 is provided from the dissipation zone 2, treated water from the sedimentation zone 1, and any required or desired make-up water from block 27. The amount of water from the various locations may be adjusted based on establishing the appropriate current/flow within the large water body 3, and evaporation, among other factors. The pump 25 provides water to the one or more inlet nozzles 26, which together with the natural influence of water currents produced by winds and/or the horizontal and vertical water temperature differences of the water body, establish the current or flow (indicated by the plurality of arrows 14) from the dissipation zone 2 to the sedimentation zone 1. The system for dosing chemicals 29 provides chemicals to the pump 25 and optionally provides chemicals directly to the dissipation zone 2.

The system for dosing chemicals 19 comprising one or more inlet nozzles provides the necessary chemicals to the sedimentation zone 1. For example, the system for dosing chemicals 19 provides the necessary disinfectant for the desired CT cycle and the flocculant composition. The system for dosing chemicals 19 comprising one or more inlet nozzles may be extended for additional lengths or positions along the periphery 12 for treatment based on the size of the large water body 3. Treated water can also be drawn from the sedimentation zone 1 through a pump 30 to the pump 25 or to the system for dosing chemicals 19.

Figure 6:
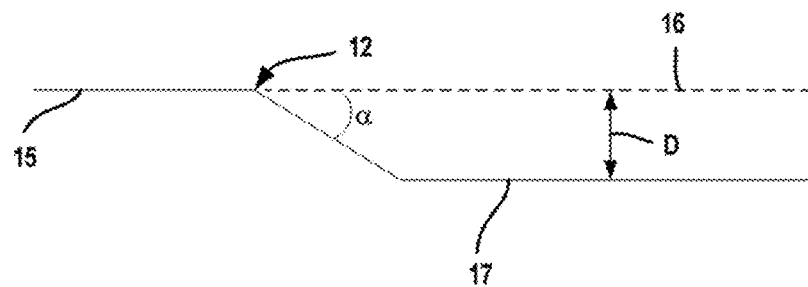
FIG. 6 schematically illustrates a portion of the periphery 12 of a large water body in an area of the dissipation zone 2.

Now referring to FIG. 6, a schematic cross section of a portion of the dissipation zone 2 is illustrated. The periphery 12 is shown as the demarcation between the shore or edge 15 and the water within the large water body 3. The downward slope from the periphery 12 to the bottom surface is preferably at an angle a that results in a slope of up to 15%. This provides an entrance into the water 16 from the shore 15 that is safe and generally comfortable for bathers entering the water.

The Contamination Reduction Index (CRI) is an index calculated based on a standardized protocol developed in the present disclosure to represent the safety and sanitary conditions of a water body treated according to the method of the invention.

In the context of the invention, the Contamination Reduction Index (CRI) is an Index that determines the time in minutes needed to dissipate a sample of an aqueous solution out of a defined water zone. In particular, the Contamination Reduction Index (CRI) indicates the time in minutes counted as from the moment that a sample of a tinted solution is added to a particular point within a dissipation zone 2 until the tinted solution is dissipated and is not visually detectable in said dissipation zone 2.

The Contamination Reduction Index (CRI) fairly represents the time that it will require for an aqueous contaminant brought in by a bather or by other means into a dissipation zone 2 to be dissipated out of that dissipation zone 2 into the sedimentation zone 1. The CRI is therefore a suitable and objective standard to assess the ability of said water zone to dissipate a contaminant in a short timeframe into the sedimentation zone 1, wherein said contaminant can be subsequently inactivated, flocculated and removed out of the sedimentation zone 1, maintaining thus safe and sanitary conditions in case of a contamination event.

The CRI, which counts the time as from the moment that the sample of a specific tinted solution is added into the dissipation zone 2 until the same is not visually detectable in said dissipation zone 2, depends on several of factors. In the context of the present invention, the CRI of the dissipation zone 2 is influenced mainly by: the presence of an open connection to a sedimentation zone 1, the disposition of one or more inlet nozzles that inject a water flow into the dissipation zone 2 and the natural influence of water currents produced by winds and/or the horizontal and vertical water temperature differences of the water body.

In a preferred embodiment of the invention, the dissipation zone 2 is configured to allow a Contamination Reduction Index (CRI) of up to 30 minutes, more preferably of up to 25 minutes, more preferably of up to 20 minutes and even more preferably of up to 15 minutes and even more preferably of up to 10 minutes.

The CRI can be determined in several ways, either from qualitative and/or quantitative data and analysis.

In one embodiment, the information regarding the time required to complete the dissipation of a sample of a tinted solution can be obtained qualitatively by visual inspection, methods based on experience, or estimate projections. In other embodiment, the information regarding the time required to complete the dissipation of a sample of a tinted solution can be obtained from one or more manual or automatic monitoring devices.

The standardized protocol to determine the Contamination Reduction Index (CRI) according to the present invention comprises assessing the time required for a water zone (a dissipation zone 2) of 144 m3 to dissipate 7L of a tinted aqueous solution comprising 30 g/L of carmine (natural red 4) and 77 g/L of NaCl out of said water zone until the tinted solution is not visually detectable in said water zone. While the test is being conducted, and in order to ensure the visual detection of the tinted solution in the dissipation zone 2, the water zone should be free of chemical agents that may reduce the detection of colorant, such as chlorine and other disinfectant agents. Once the test is finalized, chemical agents should be reestablished according to the specifications of the dissipation zone 2.

The Contamination Reduction Index (CRI) provides therefore an objective projection of the efficient water dissipation patterns of the dissipation zone 2 according to the present invention, which combined with a permanent minimum disinfectant concentration as well as with an open connection to a sedimentation zone 1 that is configured to inactivate, flocculate and eliminate dangerous microorganisms, amongst other factors, allows providing safe and sanitary conditions for large water bodies for direct contact recreational purposes.

The combined disinfection methods, efficient diffusion pattern and sedimentation capacity of the water bodies according to the present invention create unprecedented safe environments for water recreational purposes that have not been described nor applied before and that solve the inefficiencies of conventional swimming pool technologies and those of partly treated large water bodies, allowing thus the creation of recreational water bodies that minimize the risk of infections caused by microorganisms such as bacteria, protozoa, amoebas, microalgae and parasites, amongst others, solving thus the inefficiencies of current methods and systems in an innovative manner and at low costs.

In addition to the above, the method of the present invention also allows to reduce costs compared to conventional swimming pools systems and methods, where for example a 2 hectare conventional swimming pool would require a yearly operation cost of up to US$ 1.9MM considering chemical use and electricity use, whereas the method of the present invention would bring a yearly operation cost to less than US$ 140,000 (considering chemicals and energy costs as well) up to a 90% of reduction in annual maintenance costs.

Additionally, the method of the present invention allows minimizing the risk of contamination from microorganisms that current technologies are not capable of treating. As previously mentioned, current swimming pool technologies or partial treatment technologies for man-made water bodies have not been able to efficiently provide a high sanitary effect and have not been able to inactivate and/or remove microorganisms that cause recreational water illnesses or other infections that could even lead to fatal outcomes. On the other hand, the method from the present invention, in addition to having low capital and operation costs, allows inactivating and/or removing microorganisms from recreational water bodies in an innovative manner, generating a new concept of water sanitation at low costs.

By using the method of the present invention, optimum settling and sanitary conditions are achieved, where the sedimentation zone 1 is designed to efficiently settle the microorganisms contained within such sedimentation zone 1 water volume, and where the dissipation zone 2 allows maintaining safe and sanitary conditions for high density of bathers at low costs.

Figure 7:
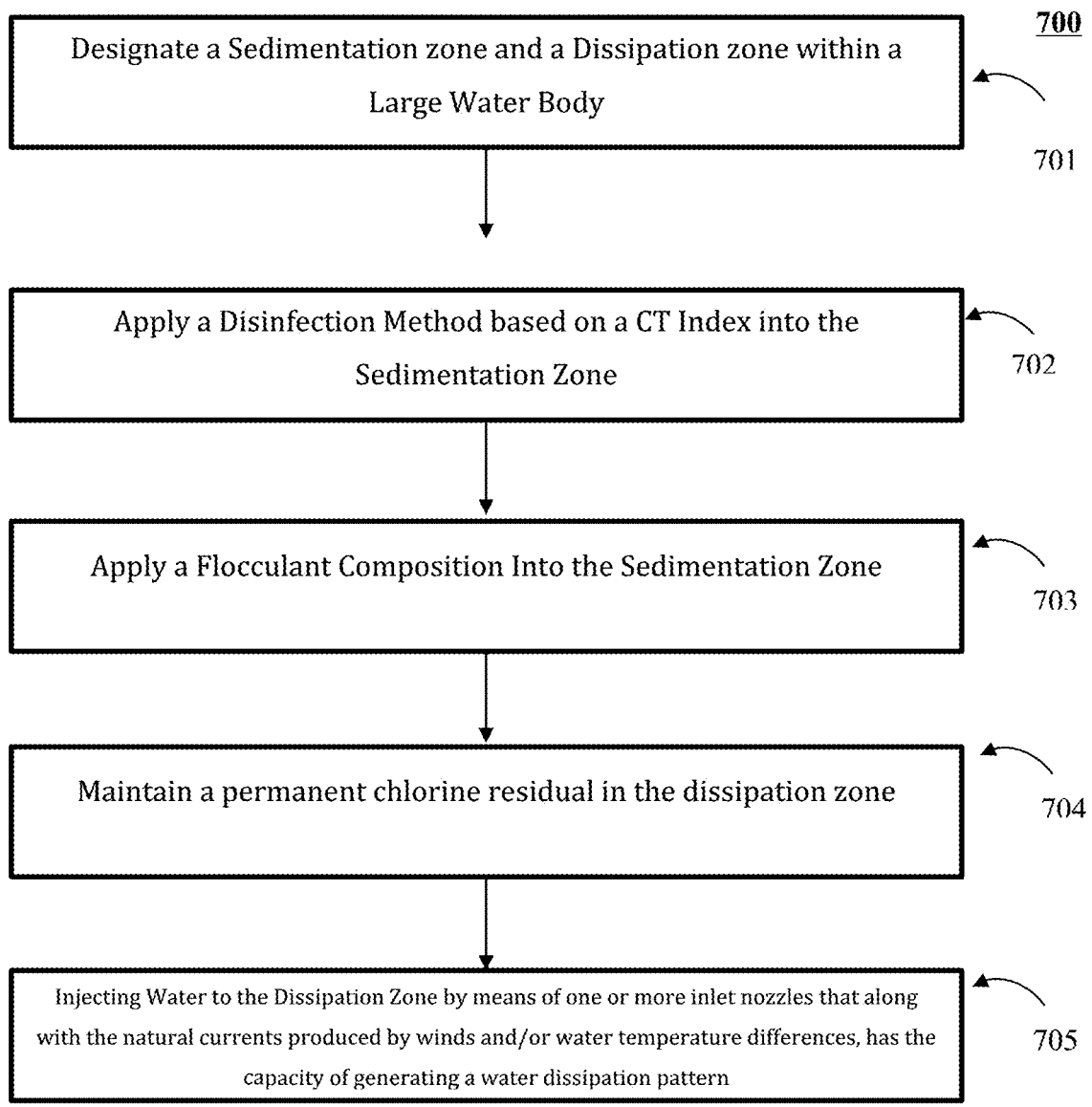
FIG. 7 illustrates an embodiment method utilized in connection with the present invention.

Referring to FIG. 7, there is provided an overview of the steps designated at 700 in an embodiment in accordance with the principles of the invention. In addition, the steps illustrated in FIG. 7 do not require that the steps be performed in the order shown.

First at step 701, a sedimentation zone 1 and dissipation zone 2 are designated within the same large water body 3. The two zones are not separated by a physical barrier and the ratio between the volume of water contained within the dissipation zone 2 and the volume contained within the sedimentation zone 1 is from 1:2 to 1:40. In addition to functioning for disinfection and sedimentation, the sedimentation zone 1 also has an aesthetic purpose and is used mainly for the practice of aquatic sports with secondary contact purposes. It is therefore designed to have a density of bathers lower than the dissipation zone 2, wherein as a daily average no more than 20% of the total number of bathers within the large water body 3 is present in the sedimentation zone 1. The dissipation zone 2 is used for direct contact purposes, such as swimming and bathing. It is designed to have a high density of bathers, wherein as a daily average, at least 80% of the total number of bathers within the large water body 3 is present in the dissipation zone 2 with a maximum density of 1 bather per 2 m2.

Next at block 702, a disinfection method based on a CT index is applied to the sedimentation zone 1 water volume. The CT index requires that the sedimentation zone 1 is treated by adding disinfectant agents to achieve a specific concentration "C" of the disinfectant during a minimum contact time of "T" in the complete water volume of the sedimentation zone 1. The disinfection method is performed such that the disinfectant agents are applied to the water volume contained in the sedimentation zone 1 to achieve a CT index of at least 42 every 72 hours.

At block 703, an efficient amount of a flocculant composition is applied into the sedimentation zone 1. The flocculant aids in the settling of different microorganisms and/or contaminants that are present in the sedimentation zone 1. The water flows and water circulation within the sedimentation zone 1 are preferably maintained at a to allow a proper sedimentation.

At block 704, a permanent chlorine residual is maintained in the dissipation zone 2 water volume by adding an efficient amount of chlorine so that a level of at least a 0.5 mg/L free chlorine level is maintained in the water volume contained within the dissipation zone 2.

At block 705, water is injected to the dissipation zone by means of one or more inlet nozzles that—along with the natural currents produced by winds and/or water temperature differences—allow generating a water dissipation pattern of the volume of water within the dissipation zone 2 into the sedimentation zone 1. The dissipation zone 2 is configured to allow a Contamination Reduction Index (CRI) of up to 30 minutes.

EXAMPLE I

In order to demonstrate the technical effect of the present invention, the following tests were conducted:

FIG. 3 shows a water body 3 having a sedimentation zone 1 and a dissipation zone 2 according to the present invention, wherein the dissipation zone 2 comprises a nozzle system and has a residual chlorine concentration of approximately 0.5 mg/L. FIG. 2 shows the estimated location of the delimitation means 4, depicted as a dotted line, which is not a physical barrier and also depicts an adjacent (but completely independent) swimming pool (7) having conventional swimming pool technology, i.e., not having separate dissipation 2 and sedimentation 1 zones according to the present invention.

Figure 4A:
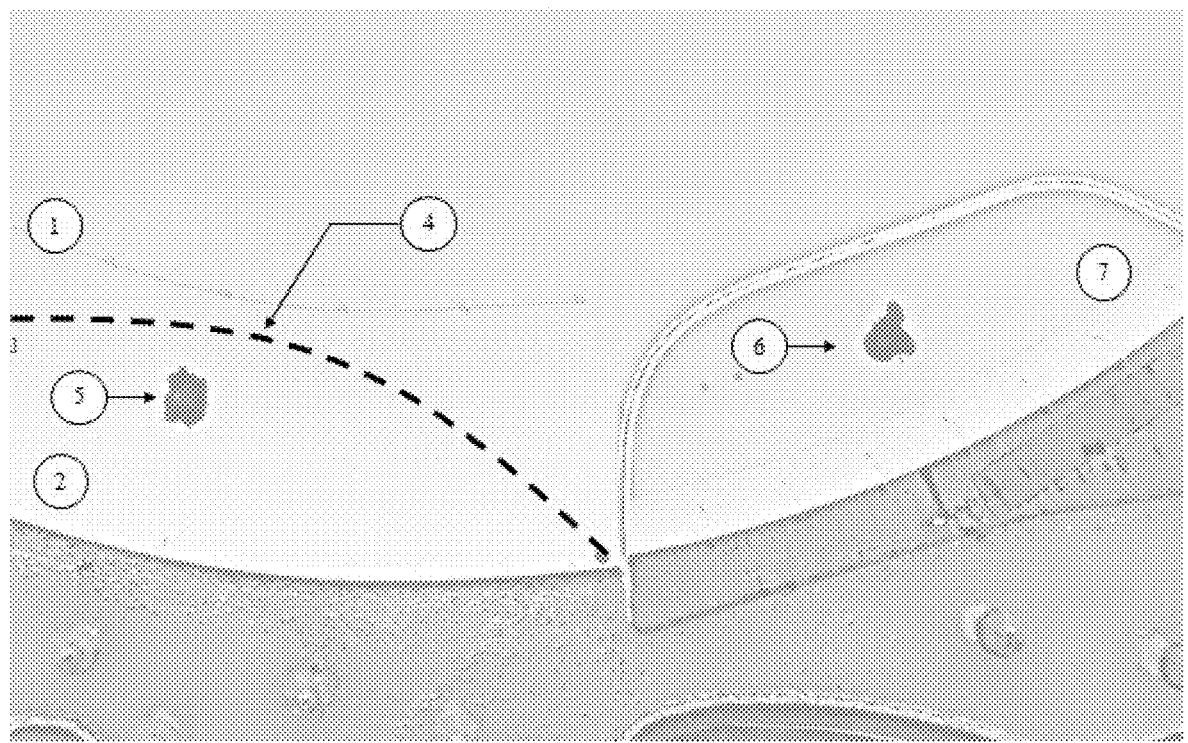
FIGS. 4A-4G show an exemplary embodiment of the invention where the method of the invention is illustrated.

FIG. 4A shows that at t=0, 7 L of a red-tinted solution (5) comprising 30 g/L a colorant natural red 4 and 77 g/L NaCl were directly added into a spot located in the dissipation zone 2 of the water body 3 in order to determine the CRI of said zone and to emulate, for example, the behavior of an aqueous fecal contamination or other type of contamination brought into the dissipation zone 2, which is the zone that is mainly used for swimming, bathing, and direct contact recreational purposes. FIG. 4A also shows that an equivalent amount of a second red-tinted solution (6) was added into a spot inside the adjacent swimming pool (7).

At t=0, the water nozzles of the dissipation zone 2 were activated while the standard recirculation systems of the swimming pool (7) were operated according to its standard operating parameters.

Figure 4B:
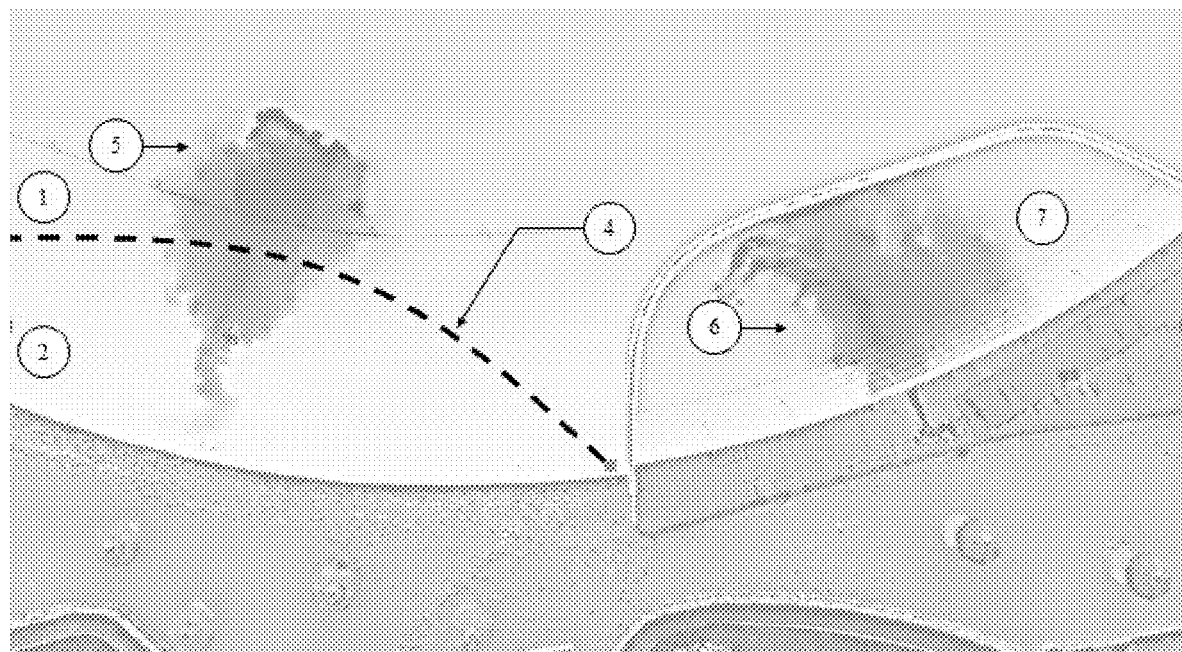

At t=5 minutes (FIG. 4B), it is seen that the red-tinted solution rapidly dissipates into the sedimentation zone 1 while in the swimming pool (7) the presence of the red-tinted solution does not appear to have lowered since t=0.

Figure 4C:
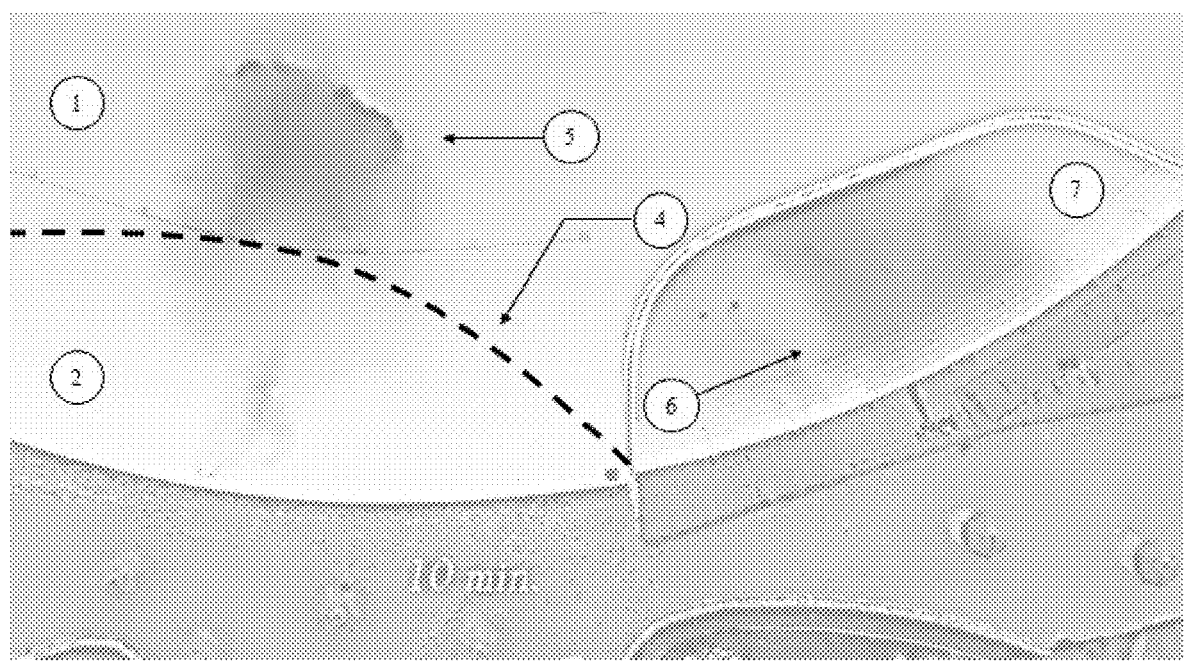
Figure 4D:
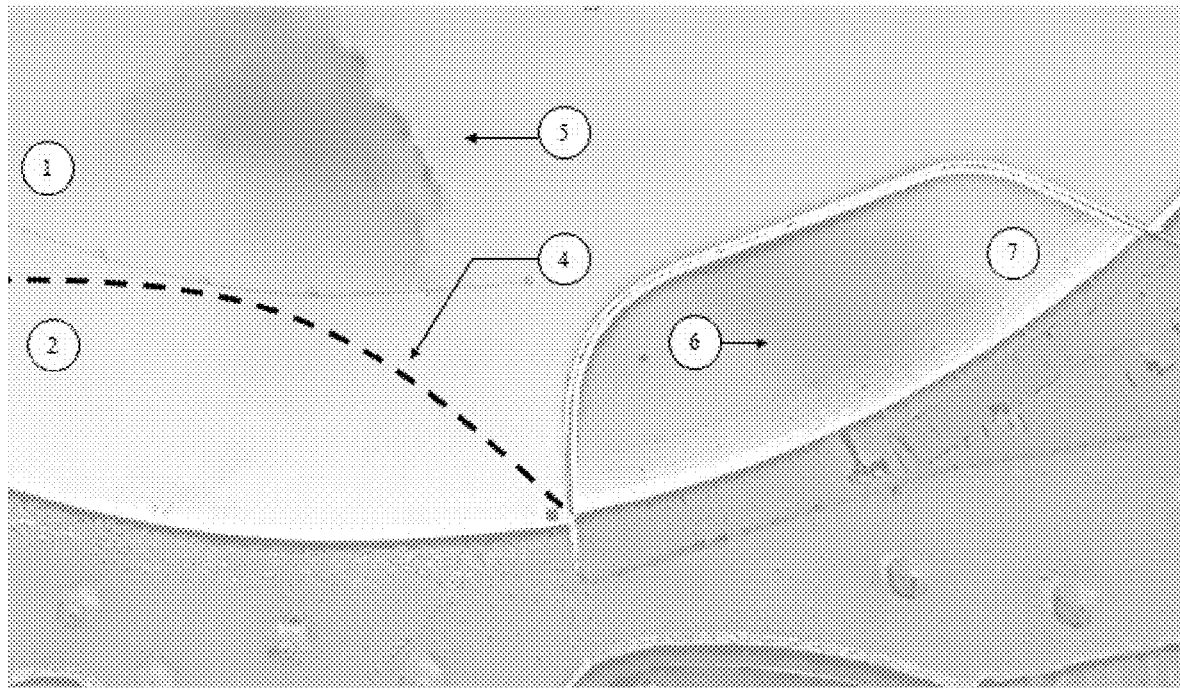

At=10 minutes and at t=16 minutes (FIGS. 4C and 4D, respectively) there was significantly less visible presence of the red-tinted solution (5) in the dissipation zone 2 whereas the swimming pool (7) still showed a substantial amount of the red-tinted solution (6).

Figure 4E:
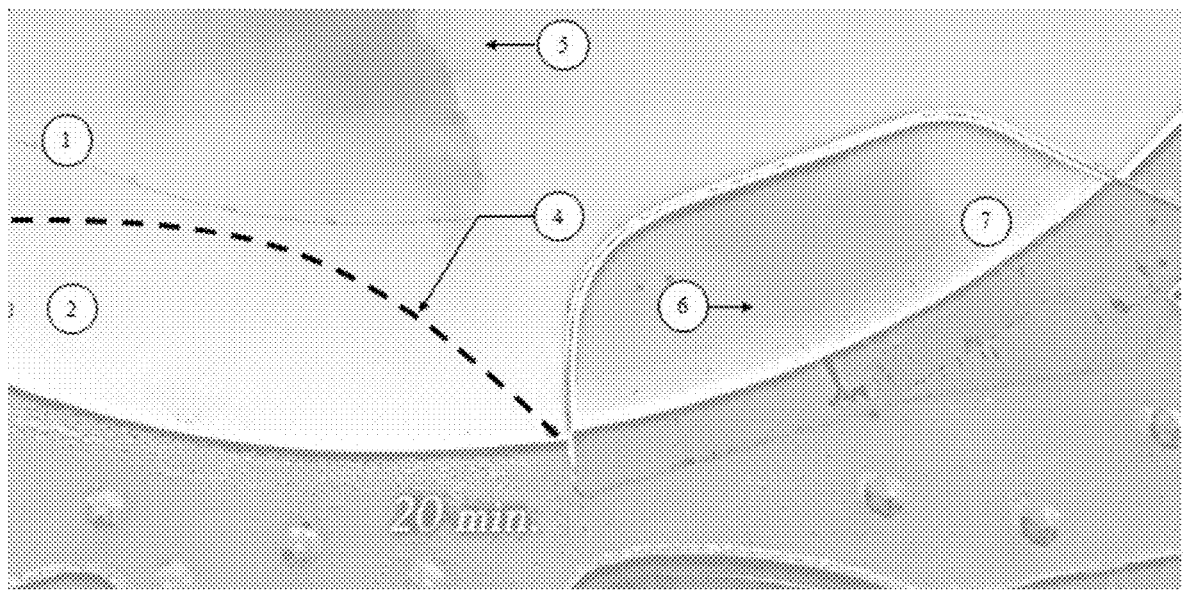
Figure 4F:
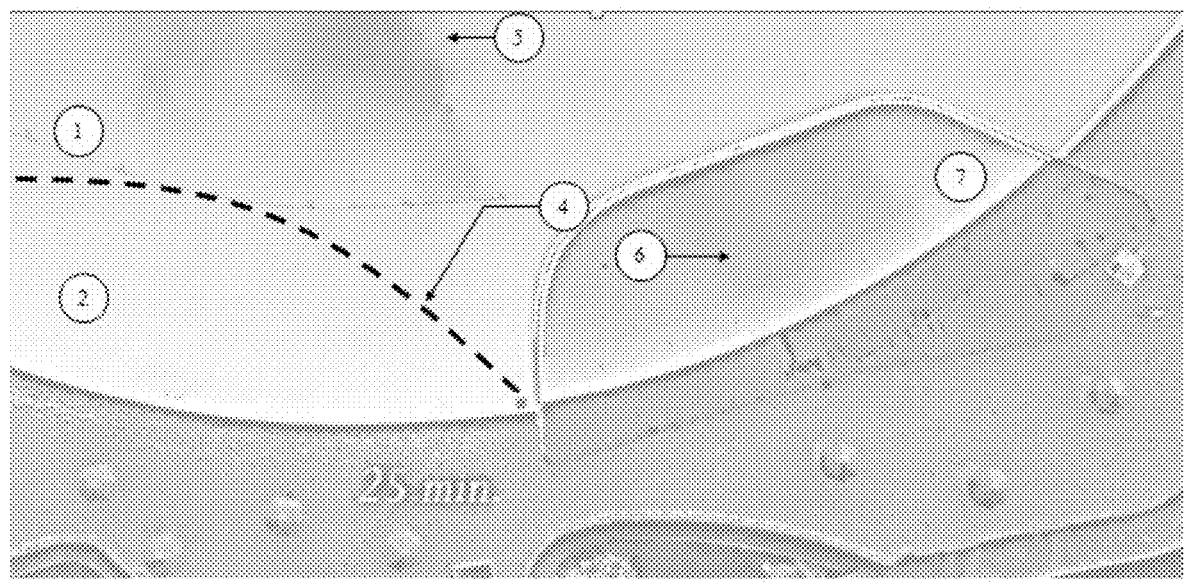
Figure 4G:
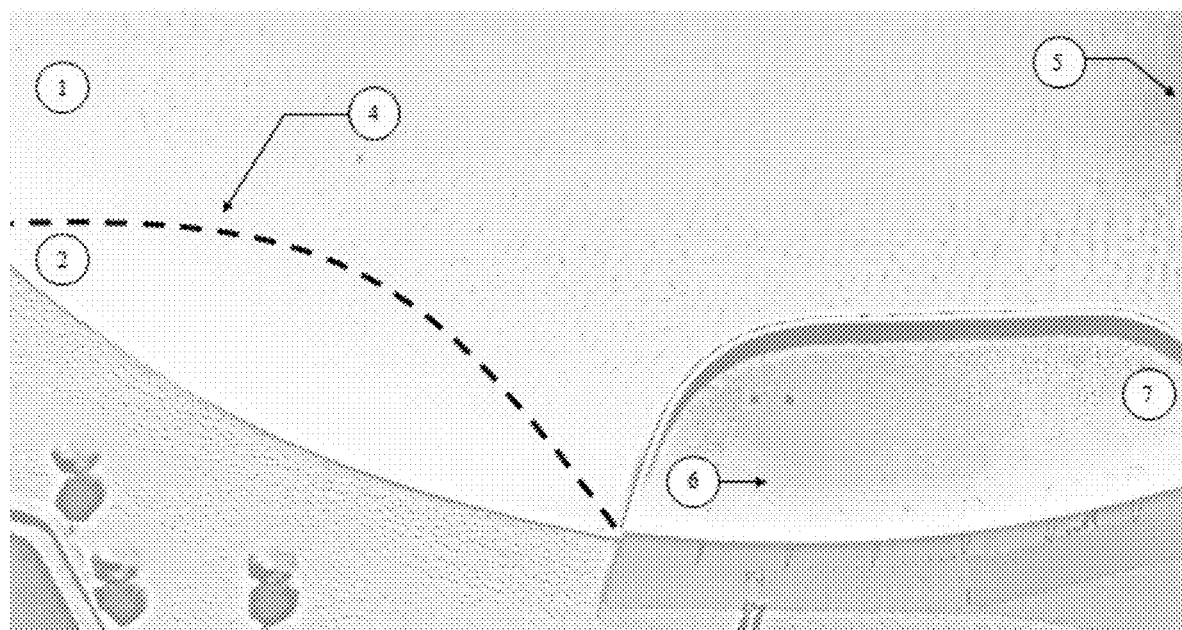

At t=20 minutes and at t=25 minutes (FIGS. 4E and 4F, respectively), the red-tinted solution (6) was still visibly present in the swimming pool (7) whereas no presence of the red-tinted solution (6) was visibly detected in the dissipation zone 2. FIG. 3G shows that at t=60, the red-tinted solution (6) is visibly present in the swimming pool (7).

Upon finalization of the test, it was determined that the sedimentation zone 2 of the example had a CRI of 20 minutes whereas the swimming pool (7) had a CRI of 100 minutes, both indexes representing the time in minutes until no presence of the red-tinted solution was visually detected.

The foregoing allows predicting that in the event of a contamination event (for example, an aqueous fecal contamination or other type of contamination) occurring in a water body according to the present invention, the dissipation zone 2, along with the natural influence of water currents produced by winds and/or the temperature differences in the water body, is able to safely and efficiently dissipate said contamination that might comprise dangerous microorganisms into a sedimentation zone 1 for its subsequent inactivation, flocculation and removal in a short time frame, thus minimizing the risk of bathers becoming infected by dangerous microorganisms. Furthermore, since the dissipation zone 2 is configured to have a residual free chlorine concentration of at least 0.5 mg/L, said dissipation zone 2 can withstand a massive use of bathers without compromising the sanitary quality of such zone due to the fact that in the event of a contamination, the microorganisms can be dissipated in a more efficient and safe way compared to conventional swimming pools maintaining at the same time safe and sanitary conditions in the dissipation zone 2 which is the zone that is used for direct contact recreational purposes. Under the same scenario, when a fecal contamination or traces thereof carrying dangerous microorganisms takes place in a conventional swimming pool (7), the contamination would remain for an extended period in the water volume, increasing the risk of bathers becoming infected by said dangerous microorganisms.

Therefore, it has been shown that the combined disinfection methods, efficient diffusion pattern and sedimentation capacity of the water bodies according to the present invention create unprecedented and safer environments for water recreational purposes compared to swimming pool technologies, allowing thus the creation of recreational water bodies that minimize the risk of infections caused by microorganisms such as bacteria, protozoa, amoebas, microalgae and parasites, amongst others, solving thus the inefficiencies of current methods and systems in an innovative manner and at low costs.

EXAMPLE II

An artificial lake built in Florida, United States, having a total surface of about 7 acres (2.8 Hectares) became heavily contaminated during the process of being filled in with water due to the presence of a nearby sand pile containing organic matter that was blown into the lake. Upon conducting laboratory tests, dangerous microorganisms, particularly *Crystosporidium* oocysts were identified in the water, which remained present in the water even after several weeks that the contamination took place.

The method according to the present invention was applied to the artificial lake.

The artificial lake was designated to include two different zones: one zone for direct contact recreational purposes designated as the dissipation zone 2 and a second zone for secondary contact recreational purposes, namely, such as for aesthetic purposes and for the practice of watersports designated as the sedimentation zone 1. The volume rate between the dissipation zone and the sedimentation zone was designed to be approximately 1:6 and the sedimentation zone 1 comprised a depth of 2 meters at its deepest point, which allowed an efficient settling of the microorganisms.

The following parameters were applied to the artificial lake:

Sodium hypochlorite was added into the dissipation zone 2 so as to achieve a permanent chlorine residual concentration of at least a 0.5 mg/L of free chlorine.

Nozzles located at the periphery 12 of the dissipation zone having an average water flow of 30 m3/hour were activated.

A disinfection treatment based on CT was applied adding chlorine to the sedimentation zone 1 so as to achieve a CT index of 42 during a 72-hours interval in the sedimentation zone 1.

A composition comprising a cationic polymer flocculant was added into the sedimentation zone 1 so that 1.5 g/m3 of water volume were incorporated within a 7-days period.

Water flows were maintained at minimum in the sedimentation zone 1 whereby disturbance to the sedimentation process is minimized.

Upon application of the method of the present invention, laboratory tests were conducted and no *Crystosporidium* oocysts were identified, result that was confirmed in two subsequent tests as summarized in the following Table 2.

TABLE 2

| Sample Location | Appearance | Odor | pH | *Crystoporodium* Oocysts |
|---|---|---|---|---|
| Sedimentation Zone 1 | Clear | No | 8.28 | Undetected |
| Dissipation Zone 2 Dosing Line | Clear | No | 8.30 | Undetected |

In addition, as it is shown in the following Table 3, all water samples complied even with stricter physicochemical and microbiological water quality standards such as the Chilean Norm NCh 409/1 2005 (Drinking Water) for water requirements.

TABLE 3

| Norm NCh 409/1 2006 | | Sample Location Sedimentation | Sample Location Dissipation Zone 2 Dosing |
|---|---|---|---|
| Test | Standard | Zone 1 | Line |
| Turbidity (NTU) | <20 | 0.8 | 0.5 |
| True Color (Pt—Co) | <20 | <5 | <5 |
| Total Coliform Bacteria NMP/100 mL | Exempt | <2 | <2 |
| *Escherichia Coli* NMP/100 mL | Exempt | <2 | <2 |

* <2 = undetectable

This example confirms that the method according to the present invention provides a low cost and sanitary efficient method for providing large water bodies with two different treatment zones for direct contact recreational purposes, which allows minimizing the risk of growth of microorganisms such as bacteria, protozoa, amoebas, microalgae and parasites, amongst others, solving thus the inefficiencies of current methods and systems in an innovative manner and at low costs.

The combined disinfection methods, efficient diffusion pattern and sedimentation capacity of the water bodies according to the present invention create unprecedented safe environments for water recreational purposes that have not been described nor applied before and that solve the inefficiencies of conventional swimming pool technologies and those of partly treated large water bodies, allowing thus the creation of recreational water bodies that minimize the risk of infections caused by microorganisms such as bacteria, protozoa, amoebas, microalgae and parasites, amongst others, solving thus the inefficiencies of current methods and systems in an innovative manner and at low costs.

While certain embodiments of the invention have been described, other embodiments may exist. Further, any disclosed method steps or stages may be modified in any manner, including by reordering steps and/or inserting or deleting steps, without departing from the invention. While the specification includes a detailed description and associated drawings, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. Low cost and sanitary efficient method for providing a large water body suitable for direct contact recreational purposes, the large water body water having a surface of at least 3,000 $m^2$, the method comprising:

designating a sedimentation zone 1 and a dissipation zone 2 in the large water body, both having different configurations and treatment methods, wherein:

the sedimentation zone 1 and the dissipation zone 2 are located within the same water body 3, and are not separated by a physical barrier, wherein a ratio between a volume of water contained within the dissipation zone 2 and a volume of water contained within the sedimentation zone 1 is from 1:2 to 1:40;

the sedimentation zone 1 has an aesthetic purpose and is used mainly for secondary non-direct recreational contact purposes, wherein the sedimentation zone 1 is designed to have a density of bathers lower than the dissipation zone 2, wherein as a daily average no more than 20% of the total number of bathers within the large water body 3 are present in the sedimentation zone 1;

the dissipation zone 2 is used for direct contact purposes, such as swimming and bathing, and is designed to have a high density of bathers, wherein as a daily average, at least 80% of the total number of bathers within the large water body 3 are present in the dissipation zone 2 with a maximum density of one bather per two square meters;

applying a disinfection method based on a CT index into the volume of water contained within the sedimentation zone 1, wherein the CT index requires that the sedimentation zone 1 is treated by adding disinfectant agents to achieve a specific concentration "C" of the disinfectant agents during a minimum contact time of "T" in the volume of water contained within the sedimentation zone 1, and wherein the disinfection method is performed such that the disinfectant agents are applied to the volume of water contained in the sedimentation zone 1 so that the CT index is at least 42 every 72 hours;

applying an efficient amount of a flocculant composition into the sedimentation zone 1 that aids in the settling of different microorganisms and/or contaminants that are present in the sedimentation zone 1, and wherein water flows and water circulation within the sedimentation zone 1 are maintained to allow sedimentation;

maintaining a permanent chlorine residual in the volume of water contained in dissipation zone 2 by adding an efficient amount of chlorine so that at least a 0.5 mg/L free chlorine level is maintained in the water volume contained within the dissipation zone 2;

injecting water to the dissipation zone 2 by means of one or more inlet nozzles 26 that along with natural currents produced by winds and/or water temperature differences, has the capacity of generating a water dissipation pattern of the volume of water contained in dissipation zone 2 into the sedimentation zone 1, and wherein the dissipation zone 2 is arranged and configured to allow a Contamination Reduction Index (CRI) of up to 30 minutes.

2. Method according to claim 1, wherein the sedimentation zone 1 and the dissipation zone 2 are delimited by delimitation means (4).

3. Method according to claim 2, wherein the delimitation means (4) is selected from the group comprising: a visual delimitation, a flotation line, a delimitation line, overhead flags, buoys, a slope change, different depth and combinations thereof.

4. Method according to claim 2, wherein the delimitation means (4) is established by means of a brochure, designations by signage or rules, a handbook, a user guideline and by written and/or verbal instructions, among others.

5. Method according to claim 1, wherein the sedimentation zone 1 has a depth of at least 1.8 meters at its deepest point, wherein an efficient depth for settling of the microorganisms and contaminants is established and disturbance from bathers is minimized.

6. Method according to claim 1, wherein the sedimentation zone 1 has a surface area of at least 1,500 m$^2$, preferably at least 6,000 m$^2$ and even more preferably of at least 10,000 m$^2$.

7. Method according to claim 1, wherein the flocculant composition comprises one or more flocculants agents selected from the group including synthetic polymers, quaternary ammonium cationic polymers, polycationic polymers, aluminum salts, calcium oxide, calcium hydroxide, and mixtures thereof.

8. Method according to claim 7, wherein the flocculant agents are selected from the group comprising a cationic or anionic polymeric flocculant and mixtures thereof.

9. Method according to claim 1, wherein the flocculant composition is added to the sedimentation zone 1 at least once every 7 days at a rate of 0.03 g to 3.0 g per m$^3$ of volume of water contained in the sedimentation zone 1.

10. Method according to claim 1, wherein a periodic cleaning of a bottom surface of the sedimentation zone 1 is performed, whereby the sedimentation zone 1 will have a more natural aspect such as natural lakes and lagoons and daily cleaning is not required.

11. Method according to claim 10, wherein the bottom surface of the sedimentation zone 1 is cleaned at least once every 7-days period.

12. Method according to claim 1, wherein the sedimentation zone 1 is designed to discourage bathers from entering the sedimentation zone 1, whereby direct contact recreational purposes are minimized and the practice of aquatic sports with secondary contact purposes is encouraged.

13. Method according to claim 1, wherein the dissipation zone 2 is designed so that it has a depth of up to 1.4 meters at its deepest point.

14. Method according to claim 1, wherein the dissipation zone 2 is designed so that it has a depth of up to 1.6 meters at its deepest point.

15. Method according to claim 1, wherein the dissipation zone 2 is designed so that it has a depth of up to 1.8 meters at its deepest point.

16. Method according to claim 1, wherein the dissipation zone 2 comprises a downward slope from a periphery 12 to the bottom surface at an angle a that results in a slope of up to 15% to achieve a safe entry to the large water body 3.

17. Method according to claim 1, wherein the dissipation zone 2 is designated so that as a daily average, at least 90% of the total number of bathers within the large water body 3 is present in the dissipation zone 2.

18. Method according to claim 1, wherein the dissipation zone 2 is designed to have a maximum density of bathers of one bather per two square meters.

19. Method according to claim 1, wherein the dissipation zone 2 is designed to have a maximum density of bathers of one bather per six square meters.

20. Method according to claim 1, wherein the dissipation zone 2 is designed to have a maximum density of bathers of one bather per eight square meters.

21. Method according to claim 1, wherein the water provided to the dissipation zone 2 through the one or more inlet nozzles 26 is treated with ultraviolet light (UV).

22. Method according to claim 1, wherein the location, design and configuration of the one or more inlet nozzles 26 can vary to achieve different types of water renewal patterns within the dissipation zone 2.

23. Method according to claim 1, wherein the dissipation zone 2 is arranged and configured to establish a Contamination Reduction Index (CRI) of up to 25 minutes.

24. Method according to claim 1, wherein the dissipation zone 2 is arranged and configured to establish a Contamination Reduction Index (CRI) of up to 20 minutes.

25. Method according to claim 1, wherein the dissipation zone 2 is arranged and configured to establish a Contamination Reduction Index (CRI) of up to 15 minutes.

26. Method according to claim 1, further comprising applying a periodic cleaning of a bottom surface of dissipation zone 2 in order to maintain the bottom surface of such dissipation zone 2 free of particles that may generate an aesthetic, safety, or sanitary impact in the water.

27. Method according to claim 26, wherein the bottom surface of the dissipation zone 2 is cleaned at least once per every 72-hours period.

28. Method according to claim 1, wherein the permanent chlorine residual is maintained in the dissipation zone 2 by the addition of chlorine tablets, by applying diluted chlorine through the one or more inlet nozzles 26 located in the dissipation zone 2, or by manually adding chlorine to such zone.

29. Method according to claim 1, wherein the large water body 3 comprises a plurality of separate dissipation zones 2, preferably located in a periphery 12 of the water body 3.

30. Method according to claim 1, wherein the large water body 3 has a volume of up to 50.000 m3 and comprises a centralized filtration system that can filter the complete water volume of the water body.

31. Method according to claim 1, wherein the permanent chlorine residual in the dissipation zone 2 is maintained by adding disinfectant agents selected from the group comprising chlorine, bromine, ozone, its derivatives and mixtures thereof.

32. Method according to claim 1, further comprising adding an efficient amount of a chlorine disinfectant in the sedimentation zone to maintain a permanent free chlorine level in the sedimentation zone, preferably of at least 0.5 mg/L.

33. Method according to claim 1, wherein the Contamination Reduction Index (CRI) is the time required for the dissipation zone 2 to dissipate a tinted solution added to the dissipation zone 2 such that the tinted solution is not visually detectable in the dissipation zone 2.

34. Method according to claim 1, wherein the Contamination Reduction Index (CRI) is the time required for dissipation zone 2 of 144 meters cubed to dissipate 7 Liters of a tinted solution comprising 30 g/L of carmine and 77 g/L of NaCl out of the dissipation zone 2 such that the tinted solution is not visually detectable.

35. Method according to claim 1, wherein the CT index requires a concentration of the disinfectant agents (C) determined in mg/L and a time (T) determined in minutes.

* * * * *